US012179878B2

(12) United States Patent
Bailar

(10) Patent No.: US 12,179,878 B2
(45) Date of Patent: Dec. 31, 2024

(54) KICK SCOOTER PERFORMANCE ENHANCEMENT

(71) Applicant: Benjamin F. Bailar, Philadelphia, PA (US)

(72) Inventor: Benjamin F. Bailar, Philadelphia, PA (US)

(*) Notice: Subject to any disclaimer, the term of this patent is extended or adjusted under 35 U.S.C. 154(b) by 649 days.

(21) Appl. No.: 17/317,351

(22) Filed: May 11, 2021

(65) Prior Publication Data

US 2021/0261216 A1 Aug. 26, 2021

Related U.S. Application Data

(63) Continuation-in-part of application No. 16/990,063, filed on Aug. 11, 2020, now Pat. No. 11,530,011.

(Continued)

(51) Int. Cl.
*B62K 3/00* (2006.01)
*B62K 21/02* (2006.01)
*B62J 25/00* (2020.01)

(52) U.S. Cl.
CPC .............. *B62K 3/002* (2013.01); *B62K 21/02* (2013.01); *B62J 25/00* (2013.01)

(58) Field of Classification Search
CPC .... B62K 3/002; B62K 15/006; A63C 2203/50
See application file for complete search history.

(56) References Cited

U.S. PATENT DOCUMENTS 6,676,138 B1 * 1/2004 Rosso ................. A63C 17/1427
280/11.221
6,837,504 B2 * 1/2005 Garner ..................... B62M 1/00
280/288.4

(Continued)

FOREIGN PATENT DOCUMENTS

CN 106904235 A 6/2017
CN 107176242 A 9/2017
(Continued)

OTHER PUBLICATIONS

"Joyfray Unisex Fitness Jump Shoes Bounce Shoes—Black and Red/Blue" Amazon product page, retrieved online on Nov. 23, 2020 from <<https://www.amazon.com/Joyfay-Black-Unisex-Fitness-Bounce/dp/B01M7XLWGN/ref=sr_1_2?crid=2LY6B9ZFSZHNJ&dchild=1&keywords=kangaroo+shoes&qid=1606156158&sprefix=kangaroo+%2Caps%2C162&sr=8-2>>.

(Continued)

*Primary Examiner* — Katy M Ebner
(74) *Attorney, Agent, or Firm* — FisherBroyles LLP

(57) ABSTRACT

The device provides an energy return mechanism associated with flexing and straightening of the scooter rider's support leg. The device includes an energy return mechanism having an end connected to the scooter such that resilient force exerted by the mechanism is longitudinally aligned with the scooter to act in a generally rearward/upward direction. A free end of the mechanism cradles the front of the rider's support leg, just below the knee. When the rider flexes the support leg, the resilient mechanism distorts in a longitudinal direction. When the rider straightens the leg, the forces stored in the resilient mechanism supplement the force of the rider's muscles. Thus, the device reduces the amount of energy used by the rider. The mechanism can be configured as an accessory to a conventional scooter or be integrated into a scooter. Certain embodiments are foldable and compatible with the foldable scooters.

22 Claims, 38 Drawing Sheets

Related U.S. Application Data

(60) Provisional application No. 62/923,847, filed on Oct. 21, 2019.

(56) References Cited

U.S. PATENT DOCUMENTS

| | | | |
|---|---|---|---|
| 7,303,032 B2* | 12/2007 | Kahlert | B62K 11/007 180/21 |
| 9,211,937 B2* | 12/2015 | Chen | B62M 1/00 |
| 2004/0061299 A1 | 4/2004 | Garner | |
| 2009/0194142 A1* | 8/2009 | Zimmerman | B62K 3/002 135/67 |
| 2010/0148460 A1* | 6/2010 | Nelson | B62K 9/00 280/87.021 |
| 2010/0225088 A1* | 9/2010 | Wernli | B62M 6/00 280/266 |
| 2015/0145225 A1* | 5/2015 | Chen | A63C 17/01 280/87.041 |
| 2017/0073031 A1* | 3/2017 | Wright | B62K 23/06 |
| 2017/0135438 A1 | 5/2017 | Khurgin | |
| 2018/0043958 A1* | 2/2018 | Kama | B62K 25/02 |
| 2021/0261216 A1* | 8/2021 | Bailar | B62K 15/006 |

FOREIGN PATENT DOCUMENTS

| | | |
|---|---|---|
| CN | 109606525 A | 4/2019 |
| CN | 112224314 A | 1/2021 |
| CN | 112278134 A | 1/2021 |
| DE | 202004014978 U1 | 2/2006 |
| EP | 1849696 A2 | 10/2007 |
| EP | 3473534 A1 | 4/2019 |
| FR | 3019136 A1 | 10/2015 |
| JP | 2010521360 A | 6/2010 |
| KR | 200433407 Y1 | 12/2006 |
| KR | 20120070470 A | 6/2012 |
| KR | 20200091644 A | 7/2020 |
| NL | 1016945 C1 | 6/2002 |
| WO | 2004000635 A1 | 12/2003 |
| WO | 2007062841 A1 | 6/2007 |
| WO | 2009146946 A1 | 12/2009 |
| WO | 2015056141 A1 | 4/2015 |
| WO | 2016055746 A1 | 4/2016 |

OTHER PUBLICATIONS

"Skyrunner Adult Kangaroo Shoes Jumping Stilts Men Women Fitness Exervice (155~200 lbs/70~90kg) Bouncing Shoes (Black)" Amazon product page, retrieved online on Nov. 23, 2020 from <<https://www.amazon.com/Kangaroo-Jumping-Fitness-Exercise-Bouncing/dp/B00M3Y8ZFS/ref=sr_1_3?crid=2LY6B9ZFSZHNJ&dchild=1&keywords=kangaroo+shoes&qid=1606156158&sprefix=kangaroo+%2Caps%2C162&sr=8-3>>.

Nichols, Greg, "Knee pain? Achy joints? Passive bionic devices are coming", Robotics, Dec. 8, 2015, retrieved online on Nov. 23, 2020 from <<https://www.zdnet.com/article/knee-pain-achy-joints-passive-bionic-devices-are-coming/>>.

* cited by examiner

KICK SCOOTER PERFORMANCE ENHANCEMENT

CROSS-REFERENCE TO RELATED APPLICATION

This application is a continuation-in-part of U.S. application Ser. No. 16/990,063, filed Aug. 11, 2020, which claims the benefit of priority under 35 U.S.C. § 119(e), of U.S. Provisional Patent Application No. 62/923,847, filed Oct. 21, 2019, the entire disclosures of both of which are hereby incorporated herein by reference.

FIELD OF THE INVENTION

The present invention relates generally to scooters, and more particularly to a kick scooter including a performance enhancement device, and a performance enhancing accessory for a conventional kick scooter.

DISCUSSION OF RELATED ART

Conventional kick scooters are commercially available. Exemplary kick scooters are sold as Razor® kick scooters. While using a kick scooter, the rider needs to overcome various sources of resistance such as headwinds, hills, rough ground, etc. The greater the resistance faced, the greater the frequency with which the rider must lower and lift their body weight to propel the scooter forward. This uses significant amounts of energy and can lead to rider fatigue. Furthermore, to overcome greater resistance, the rider must push down harder with their kicking foot, thus requiring a deeper knee bend and yet more exertion.

Certain conventional wisdom suggests that riders periodically alternate their support and kicking legs to address this issue. However, this can be awkward to do while riding. In addition, most people prefer, often strongly, kicking with one leg over the other. So, alternating legs means periodically using the less-favored leg.

A kick scooter with a relatively lower platform can help to address exertion concerns. However, such a design often runs into clearance issues, for instance when riding over bumps and/or making tight turns. In addition, the flexing of the support leg is still an issue, though to a lesser degree.

Another performance issue with kick scooters is that the rider is standing on only one leg with some support from their upper body as they grip the handlebars. This can lead to additional fatigue. It can also cause the rider's weight to shift to either side of the scooter compromising handling.

What is needed is a kick scooter that reduces exertion, lessens fatigue and reduces or eliminates the need to alternate kicking and support legs.

SUMMARY

While riding a kick scooter most of the user's energy, contrary to expectations, is consumed by the support leg rather than the kicking leg. This energy is used to repeatedly flex and extend the support leg during kicking as well as to help keep the rider's weight laterally centered over the scooter.

The present invention provides a kick scooter performance enhancement in the nature of an energy return mechanism while flexing and straightening the support leg thus reducing the energy expended by the rider. In addition, it stabilizes the ankle thus keeping the rider's weight centered over the scooter with minimal effort, further reducing energy use. This second feature also makes for very concise handling of the scooter.

The present invention involves a laterally rigid resilient mechanism, one end of which is connected to the kick scooter such that the resilient force exerted by the mechanism is longitudinally aligned with the scooter and acts in a generally rearward and upward direction. The free end of the mechanism supports a U-shaped bracket which cradles the front of the user's support leg just below the knee. The mechanism can be manufactured and sold as a discrete unit for use as an accessory to a conventional or commercially-available scooter, or it can be integrated into a scooter and be sold/distributed as an integrated scooter unit.

During riding, to propel the scooter, the rider first swings their kicking leg forward. Then the rider swings their kicking leg backwards while flexing their support leg, thus lowering their hips, so that their kicking foot makes adequate contact with the ground. The flexing of the support leg pushes the U-shaped bracket of the invention forward and down. Consequently, energy is stored in the resilient mechanism. Then, while pushing off against the ground, the user simultaneously straightens their support leg allowing the mechanism to resile thus supplementing the effort of the user.

Furthermore, because of the lateral rigidity of the resilient mechanism, any lateral shift in the rider's weight causes the scooter to lean in response. Consequently, the rider's weight is kept aligned with the scooter with minimal effort.

The present invention also includes embodiments that are collapsible/foldable and thus compatible with the collapsible/foldable designs common amongst commercial kick scooters.

Accordingly, the present invention involves a resilient mechanism affixed or attachable to a kick scooter. The free end of the mechanism supports a U-shaped rest that cradles the rider's lower leg. When the rider flexes their support leg the resilient mechanism distorts in a longitudinal direction. When the rider straightens their leg, the forces stored in the resilient mechanism supplement the force of the rider's muscles. Thus, the present invention significantly reduces the amount of energy used by the rider when lowering and lifting their weight during the kicking motion.

The present invention also tends to be laterally rigid. Consequently, it provides lateral support to the rider's support leg thus further reducing fatigue. In addition, it keeps the rider's weight laterally aligned with the scooter improving handling.

BRIEF DESCRIPTION OF THE FIGURES

An understanding of the following description will be facilitated by reference to the attached drawings, in which.

DETAILED DESCRIPTION

Figure 1:
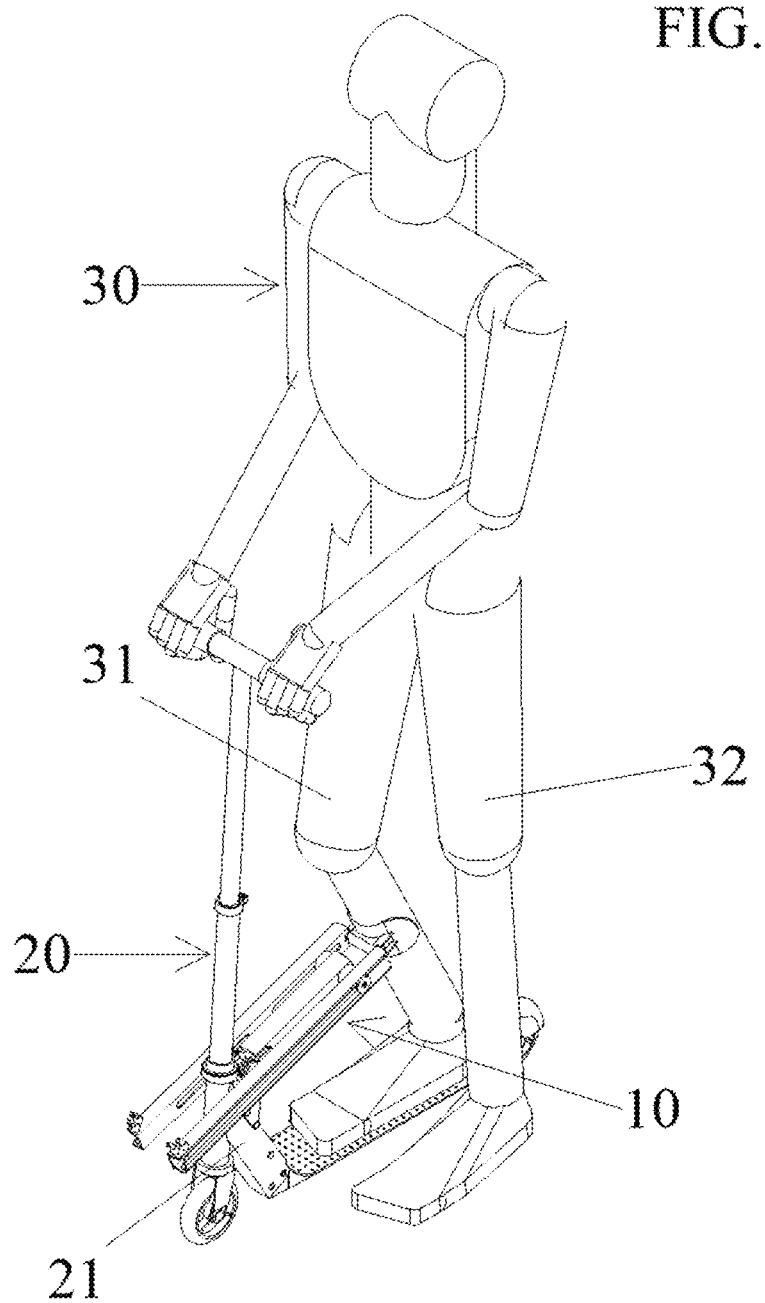
FIG. 1 is an isometric view of a scooter and performance enhancement device in use.

FIG. 1 is an isometric view of the performance enhancement device 10 mounted on the steering pivot support 21 of a kick scooter 20. The rider 30 is in mid kick, bending their support leg 31, to make ground contact with the foot of their kicking leg 32.

Figure 2:
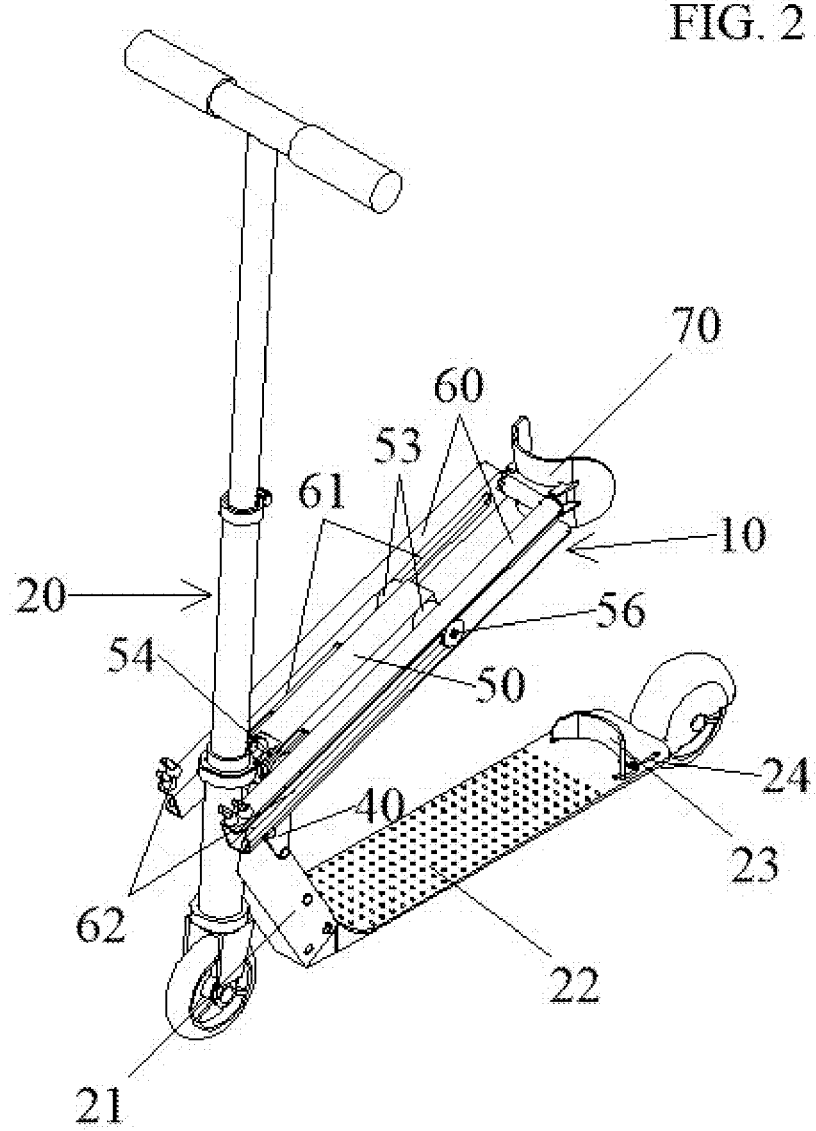
FIG. 2 is an isometric view of the device mounted on a kick scooter.

FIG. 2 is an isometric view of the device 10 of FIG. 1 mounted on a kick scooter 20 showing the leg bracket 70, outer supports 60, one of the slots 61 (In the drawing the slot is divided into two segments, but it could alternatively be continuous), rear slot supports 53, one of the front slot supports 54, inner support 50, connector 40, shock cord 62, and one of the shock cord boss caps 56. Also shown are the steering pivot support 21 and platform 22 of the kick scooter along with the heel stop 23 and one of the heel stop slots 24 of the present invention.

Figure 3:
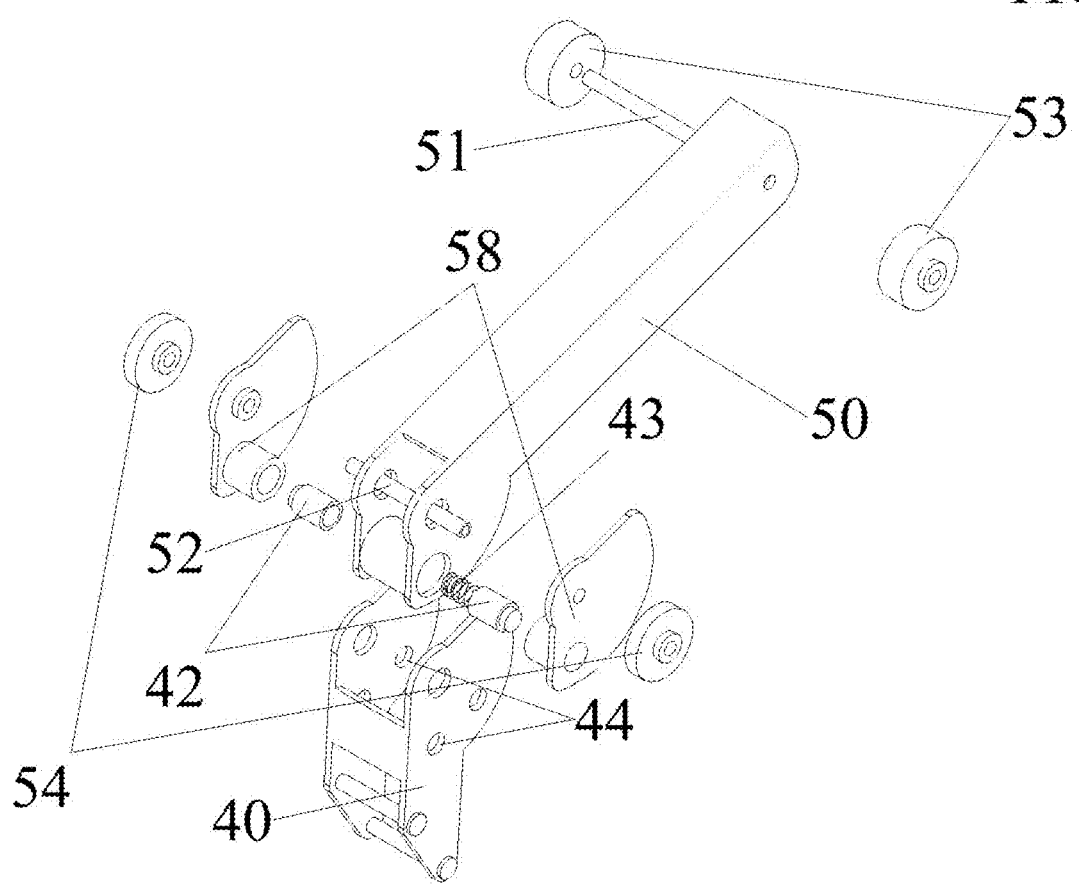
FIG. 3 is an exploded isometric view of the inner support and connector.

FIG. 3 is an exploded isometric view of the inner support 50 and connector 40 of the device 10 of FIG. 1. Also shown are the rear slot supports 53, inner support rear through rod 51, front slot supports 54, inner support front through rod 52, pivot plates 58, lock pins 42, lock pin spring 43, and lock pin holes 44.

Figure 4:
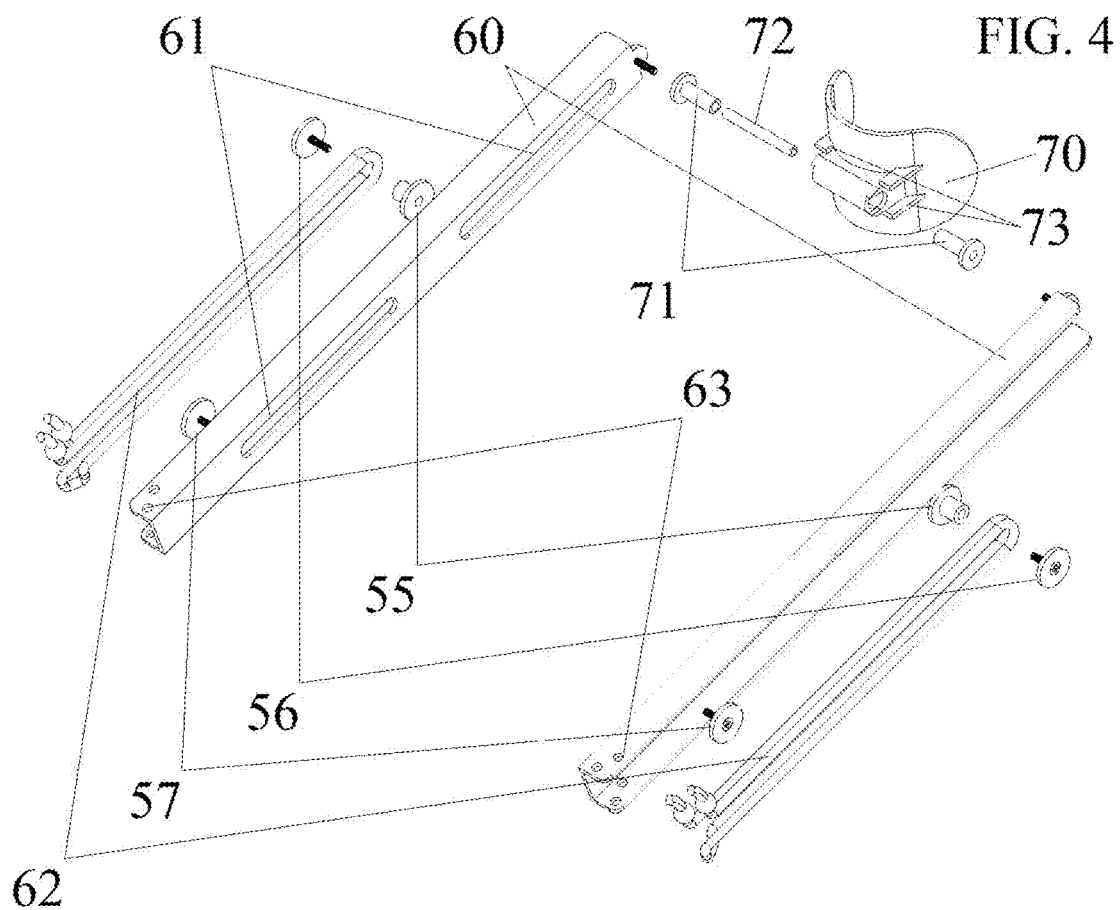
FIG. 4 is an exploded isometric view of the outer supports and leg bracket.

FIG. 4 is an exploded isometric view of the outer supports 60 and leg bracket 70 of the device 10 of FIG. 1. Also shown are the leg bracket bushings 71, leg bracket axel 72, leg bracket stops 73, one of the slots 61 (The other slot is obscured by the walls of the near outer support.), shock cord 62, shock cord holes 63, shock cord bosses 55, shock cord boss caps 56, and front slot retainers 57.

Figure 5:
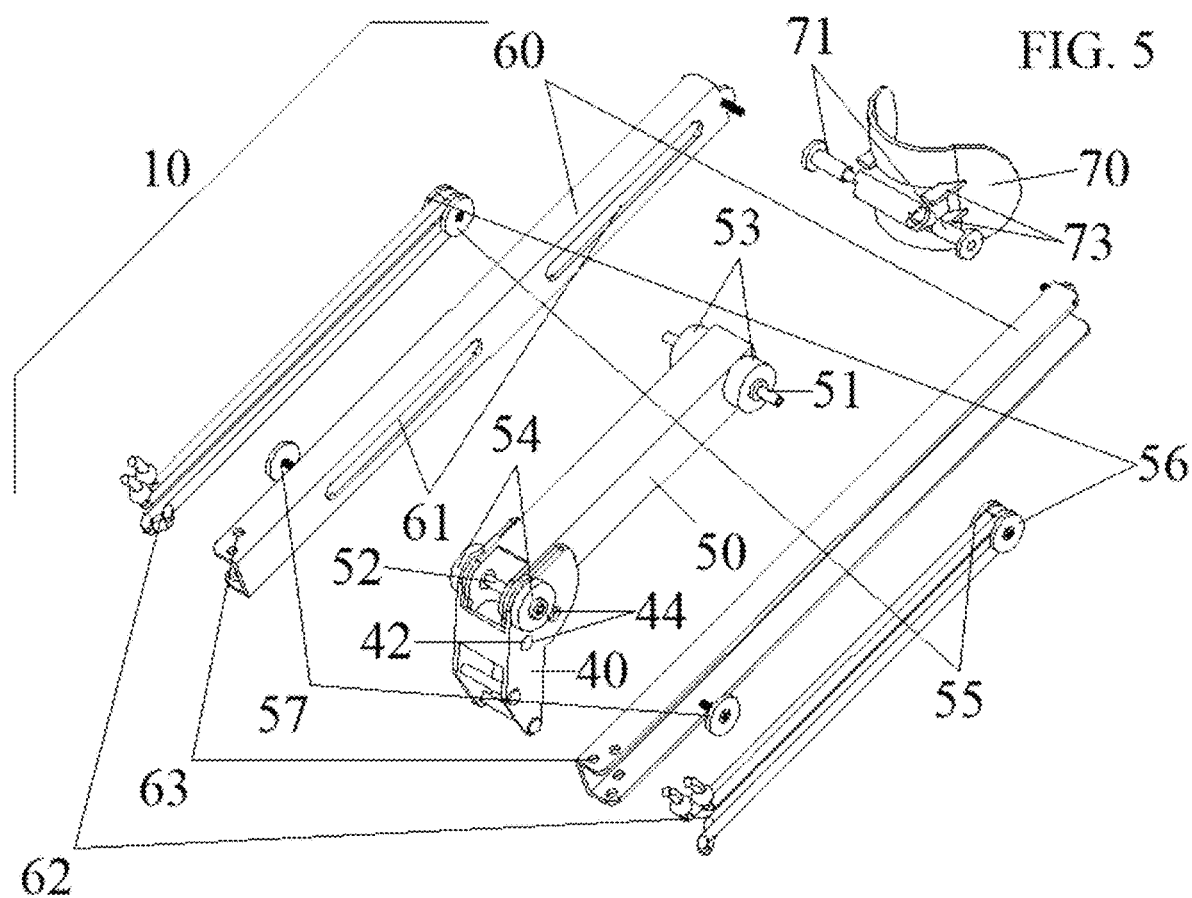
FIG. 5 is a partially exploded isometric view of the inner support, connector, outer supports, and leg bracket.

FIG. 5 is a partially exploded isometric view of the inner support 50, connector 40, outer supports 60, and leg bracket 70 of the device 10 of FIG. 1. Also shown are the leg bracket bushings 71, leg bracket stops 73, one of the slots 61, shock cord 62, shock cord holes 63, shock cord bosses 55, shock cord boss caps 56, front slot retainers 57, rear slot supports 53, inner support rear through rod 51, front slot supports 54, and inner support front through rod 52. The shock cord bosses 55 mount on either end of the inner support rear through rod 51. One of the lock pins 42 is also shown engaging one of the lock pin holes 44.

Figure 6:
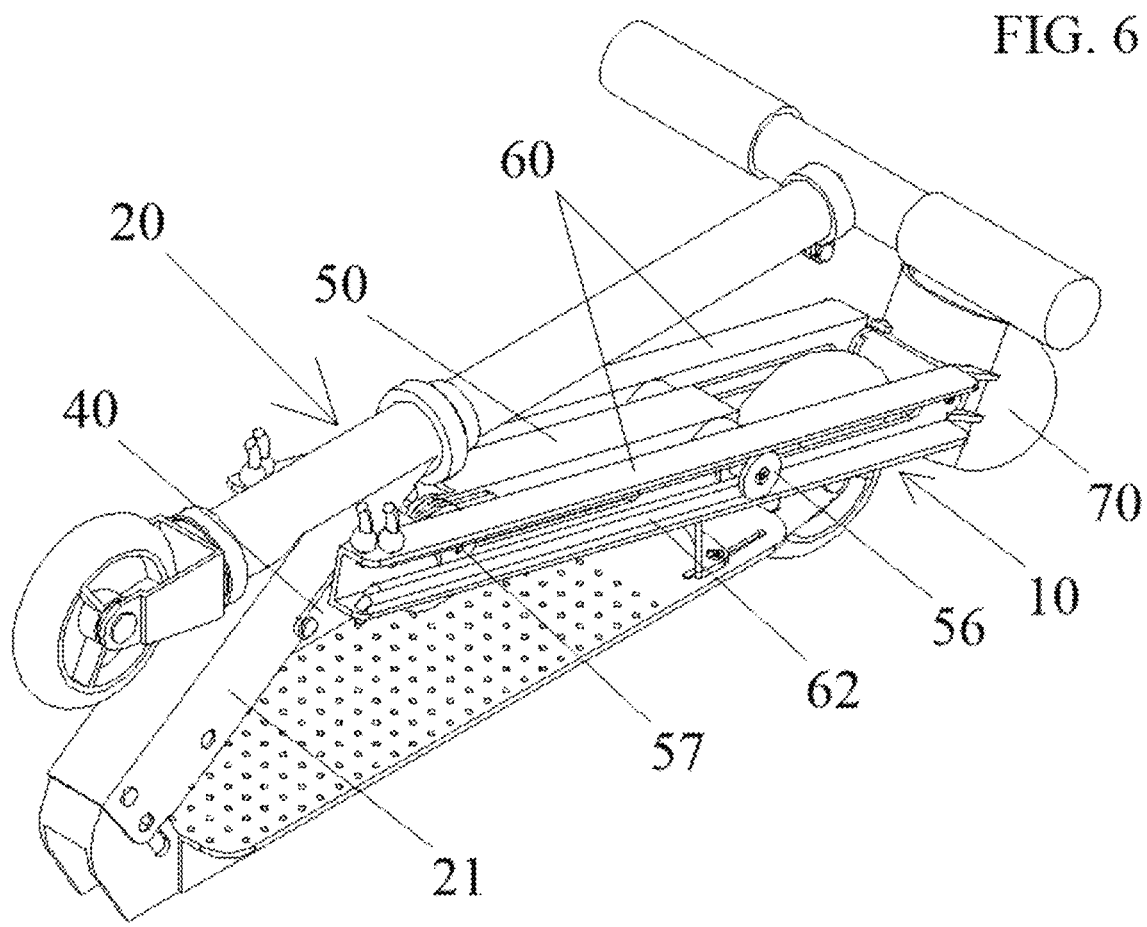
FIG. 6 is an isometric view of the device and kick scooter folded.

FIG. 6 is an isometric view of the device 10 and kick scooter 20 of FIG. 1 folded showing the steering pivot support 21, leg bracket 70, outer supports 60, inner support 50, connector 40, one of the strands of shock cord 62, one of the front slot retainers 57, and one of the shock cord boss caps 56.

FIGS. 7 through 13 represent stages in a continuous kicking motion.

Figure 7:
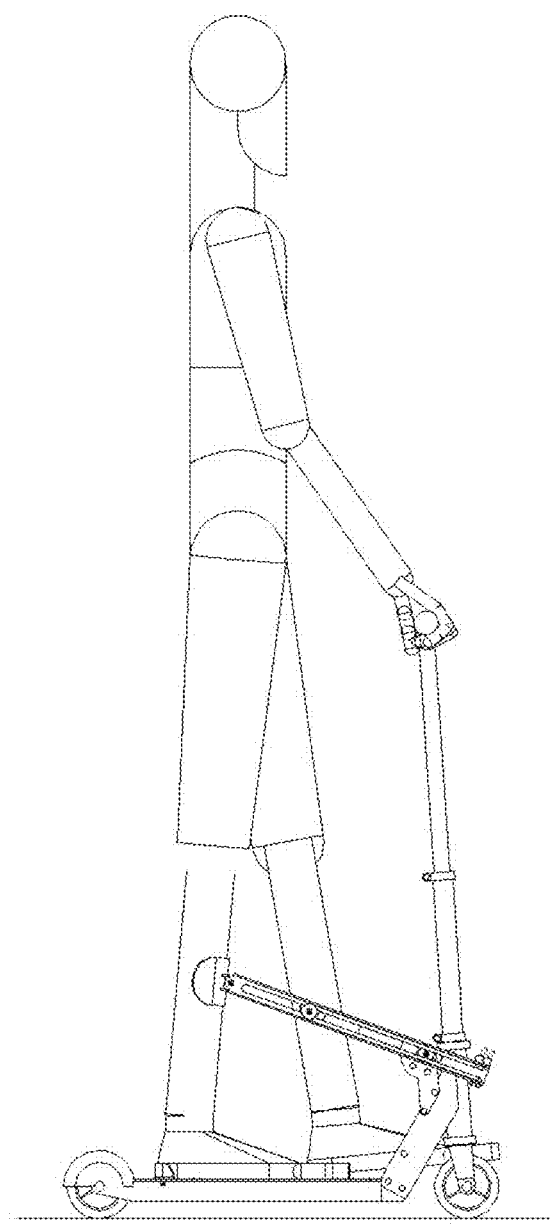
FIG. 7 is a right-side view of the device in use with the rider having swung their kicking leg forward, preparing to initiate the kicking motion.

FIG. 7 is a right-side view of the device 10 in use with the rider having swung their kicking leg forward, preparing to initiate the kicking motion. The slight forward angle of the support leg slides the outer supports forward in line with the rear and front slot supports thereby slightly stretching the shock cord beyond its preloaded state.

Figure 8:
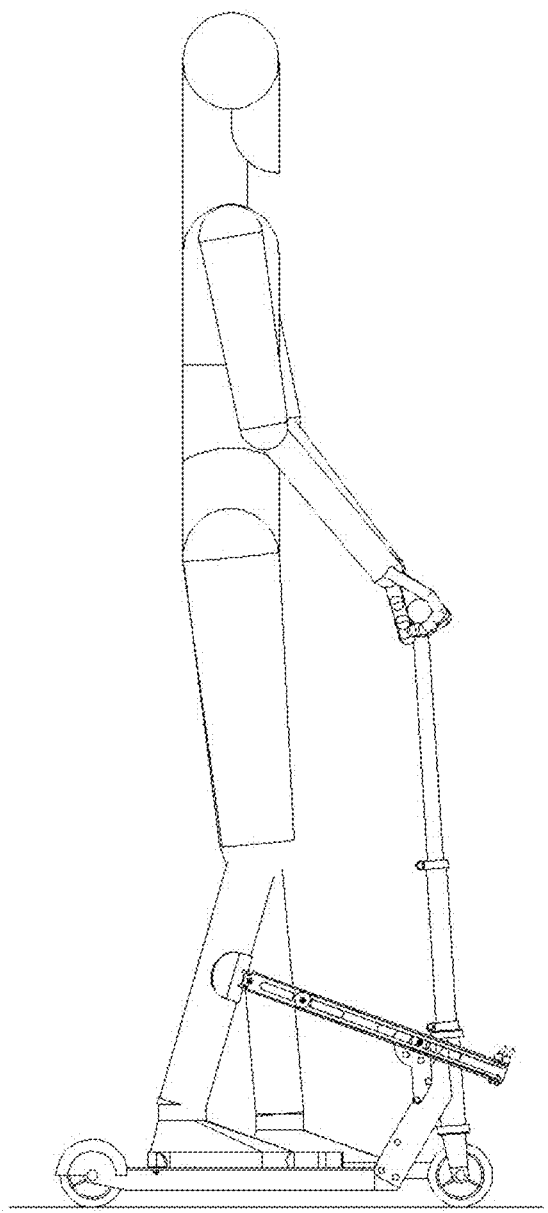
FIG. 8 is a right-side view of the device in use with the rider beginning to swing their kicking leg backwards while slightly bending their support leg.

FIG. 8 is a right-side view of the device 10 in use with the rider beginning to swing their kicking leg backwards while slightly bending their support leg. This further slides the outer supports forward further stretching the shock cord.

Figure 9:
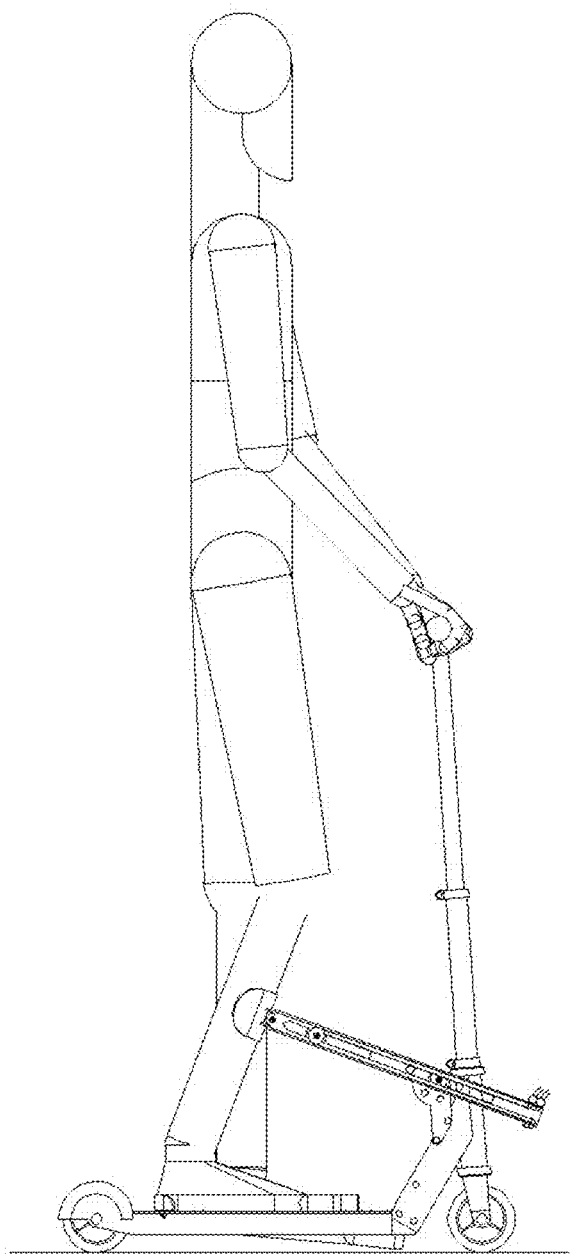
FIG. 9 is a right-side view of the device in use with the rider continuing to swing their kicking leg backwards until it's roughly in line with their body while further bending their support leg.

FIG. 9 is a right-side view of the device 10 in use with the rider continuing to swing their kicking leg backwards until it's roughly in line with their body while further bending their support leg. This slides the outer supports still further forward further stretching the shock cord.

Figure 10:
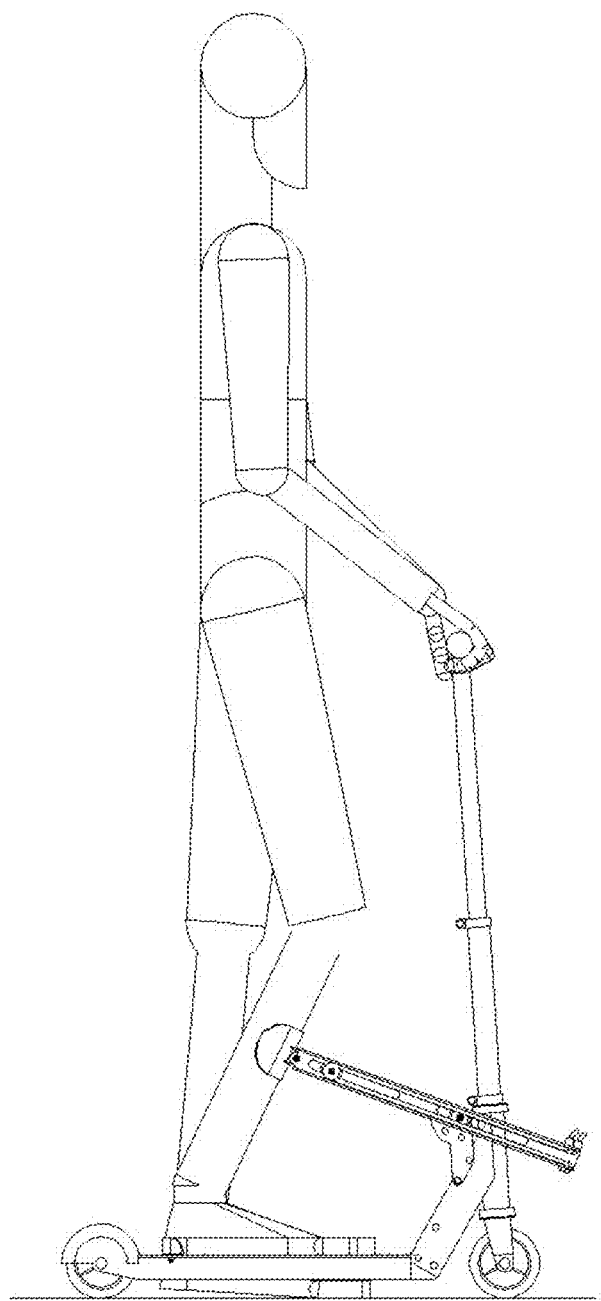
FIG. 10 is a right-side view of the device in use with the rider continuing to swing their kicking leg backward while bending their support leg so that the ball of their kicking foot contacts the ground.

FIG. 10 is a right-side view of the device 10 in use with the rider continuing to swing their kicking leg backward while bending their support leg so that they contact the ground with the ball of their kicking foot. At this point the rider is starting to propel the kick scooter forward while further sliding the outer supports forward further stretching the shock cord.

Figure 11:
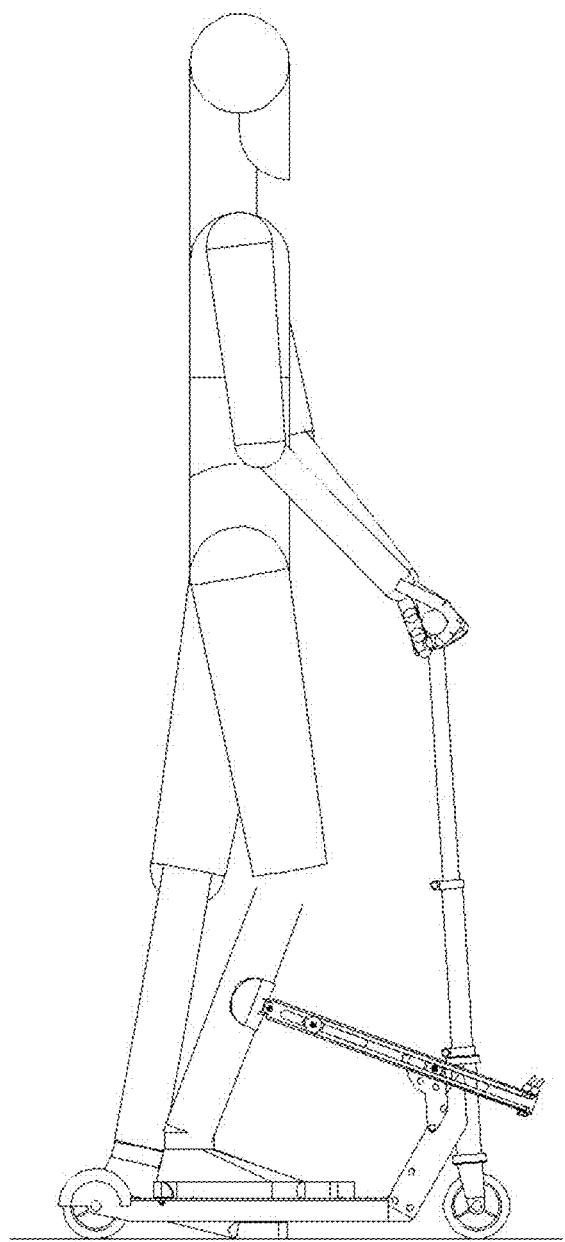
FIG. 11 is a right-side view of the device in use with the rider continuing to swing their kicking leg backward while beginning to straighten their support leg but still contacting the ground with the ball of their kicking foot.

FIG. 11 is a right-side view of the device 10 in use with the rider continuing to swing their kicking leg backward while beginning to straighten their support leg but still contacting the ground with the ball of their kicking foot. As the rider continues to propel the kick scooter forward the shock cord resiles pulling back on the outer supports thereby helping straighten the rider's support leg.

Figure 12:
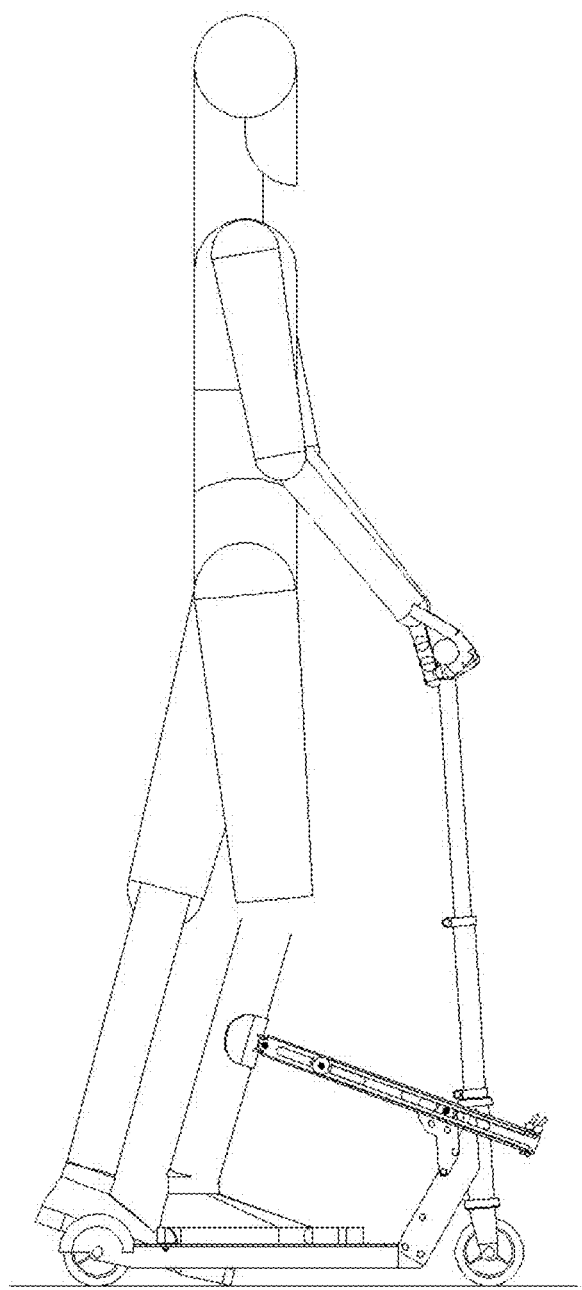
FIG. 12 is a right-side view of the device in use with the rider continuing to swing their kicking leg backward while further straightening their support leg lifting their kicking foot clear of the ground.

FIG. 12 is a right-side view of the device 10 in use with the rider continuing to swing their kicking leg backward while further straightening their support leg lifting their kicking foot clear of the ground. The shock cord continues to resile further pulling back on the outer supports thereby further helping straighten the rider's support leg.

Figure 13:
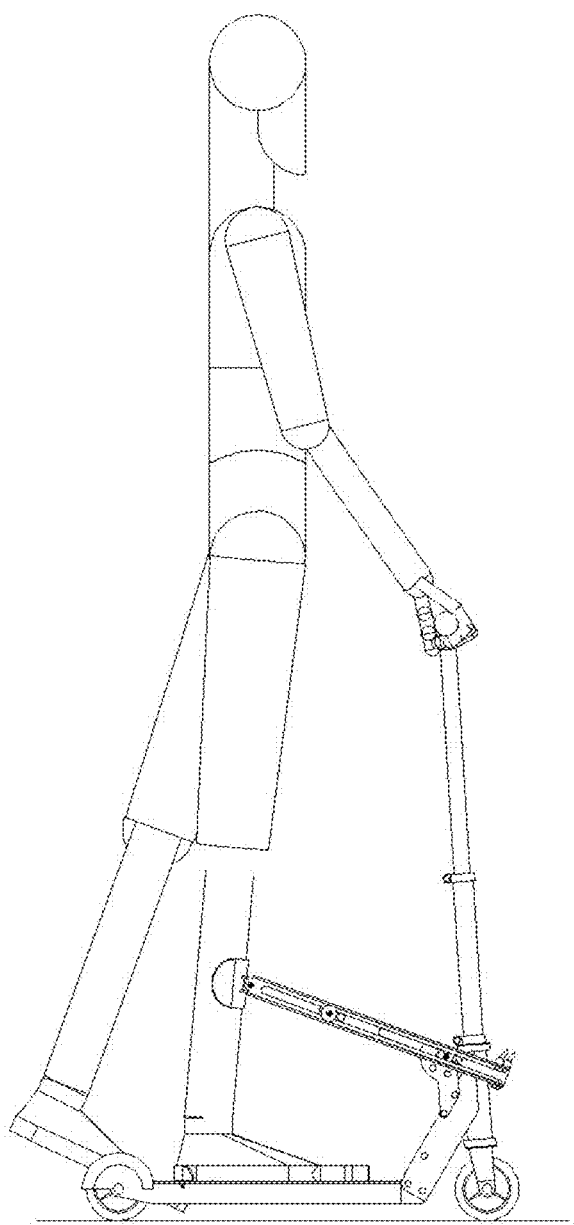
FIG. 13 is a right-side view of the device in use with the rider having swung their kicking leg backward, and fully straightened their support leg, ready to swing their kicking leg forward to initiate another kick.

FIG. 13 is a right-side view of the device 10 in use with the rider having swung their kicking leg backward, and fully straightened their support leg, ready to swing their kicking leg forward to initiate another kick. As in FIG. 7, the slight forward angle of the support leg slides the outer supports forward in line with the rear and front slot supports thereby slightly stretching the shock cord beyond its preloaded state.

Figure 14:
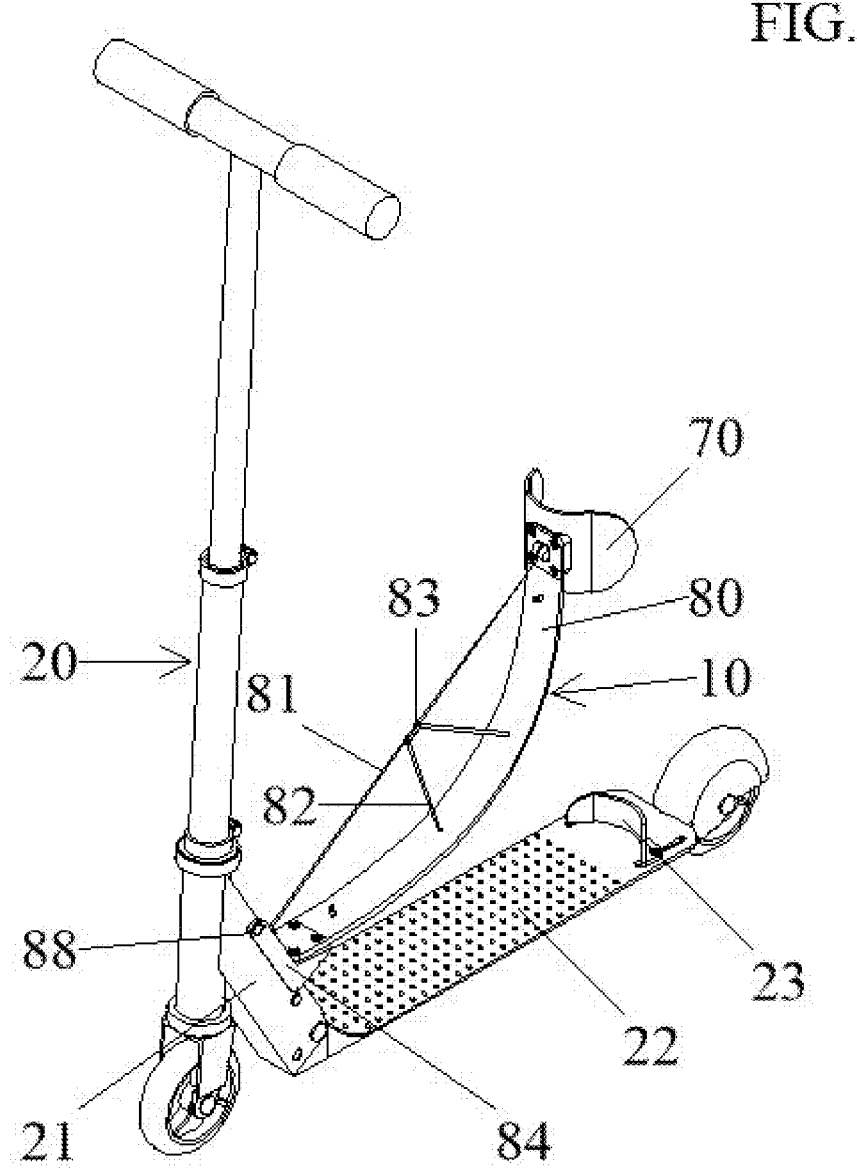
FIG. 14 is an isometric view of a second embodiment of the device, shown mounted on a kick scooter in accordance with the present invention.

FIG. 14 is an isometric view of a second embodiment of the device 10 in accordance with the present invention, mounted on the steering pivot support 21 of a kick scooter 20. Shown are the leg bracket 70, flexible resilient strip 80, preload cord 81, take-up cord 82, cord sleeve 83, hinged component 84, hinged component axle 88, platform 22, and heel stop 23.

Figure 15:
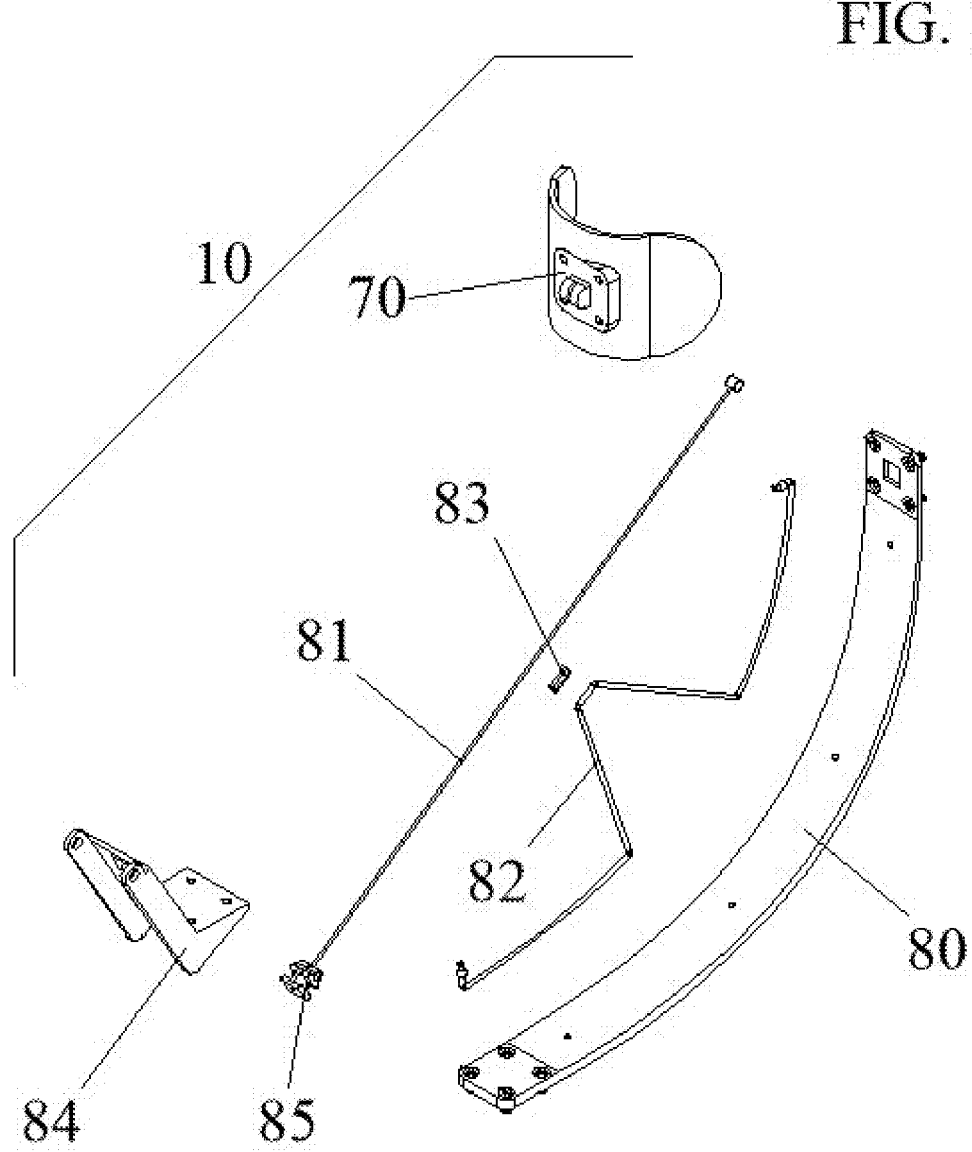
FIG. 15 is an exploded isometric view of the device of FIG. 14.

FIG. 15 is an exploded isometric view of the device 10 of FIG. 14 showing the leg bracket 70, flexible resilient strip 80, preload cord 81, take-up cord 82, cord sleeve 83, hinged component 84, and preload cord attachment 85.

Figure 16:
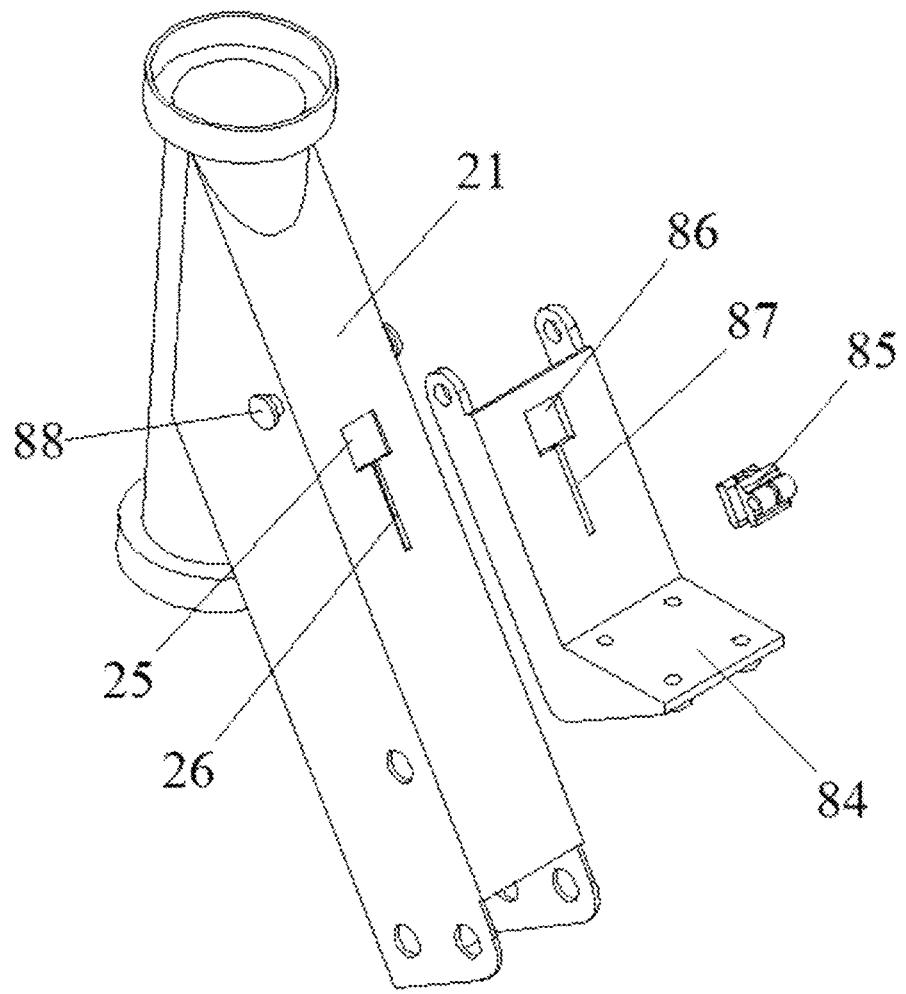
FIG. 16 is a reverse isometric view of the hinged component of the device of FIG. 14, kick scooter steering pivot support, and preload cord attachment.

FIG. 16 is a reverse isometric view of the hinged component 84 of the embodiment of FIG. 14, kick scooter steering pivot support 21, and preload cord attachment 85. Also shown are the hinged component axle 88, hinged component opening 86, hinged component slot 87, steering pivot support opening 25, and steering pivot support slot 26.

Figure 17:
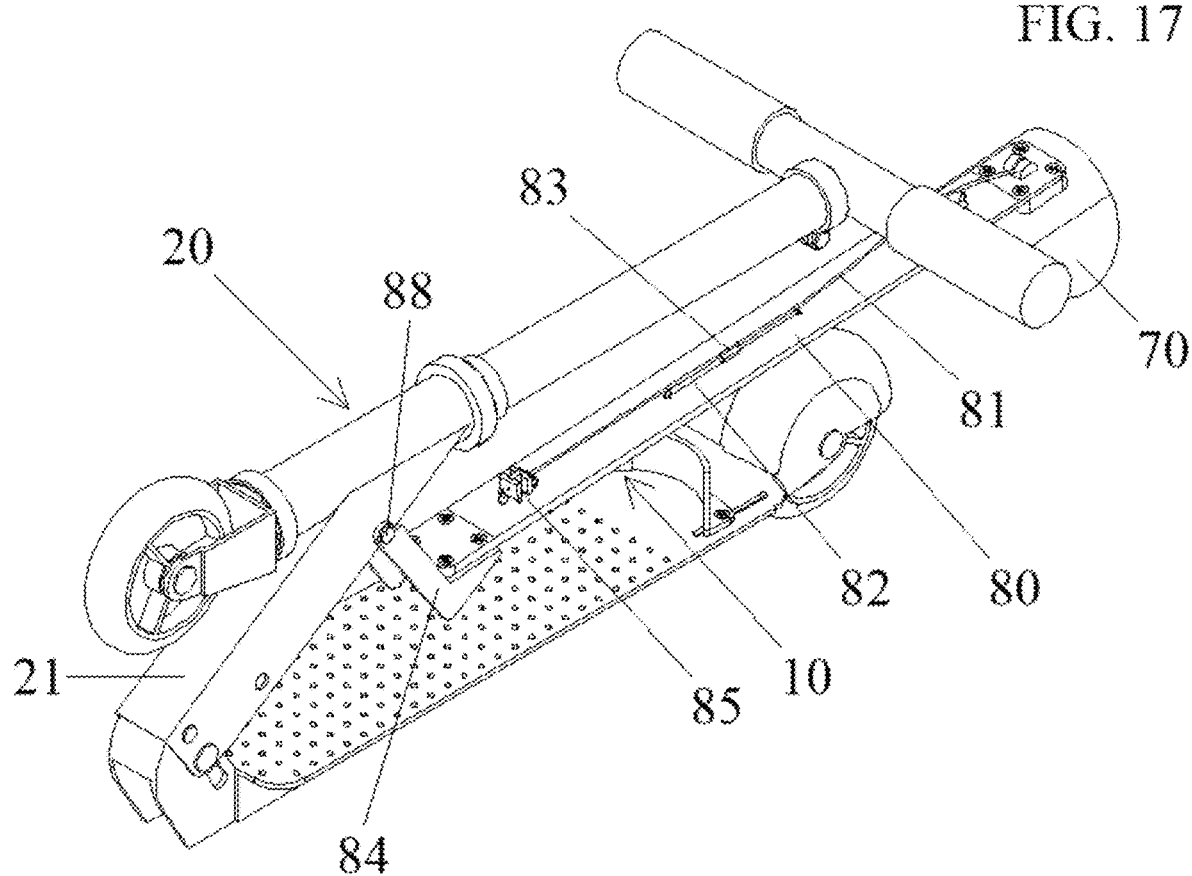
FIG. 17 is an isometric view of the kick scooter and device of FIG. 14 folded.

FIG. 17 is an isometric view of the device 10 of FIG. 14 with the invention and kick scooter 20 folded showing the leg bracket 70, flexible resilient strip 80, preload cord 81, take-up cord 82, cord sleeve 83, hinged component 84, hinged component axle 88, and preload cord attachment 85. Also shown is the kick scooter's steering pivot support 21.

Figure 18:
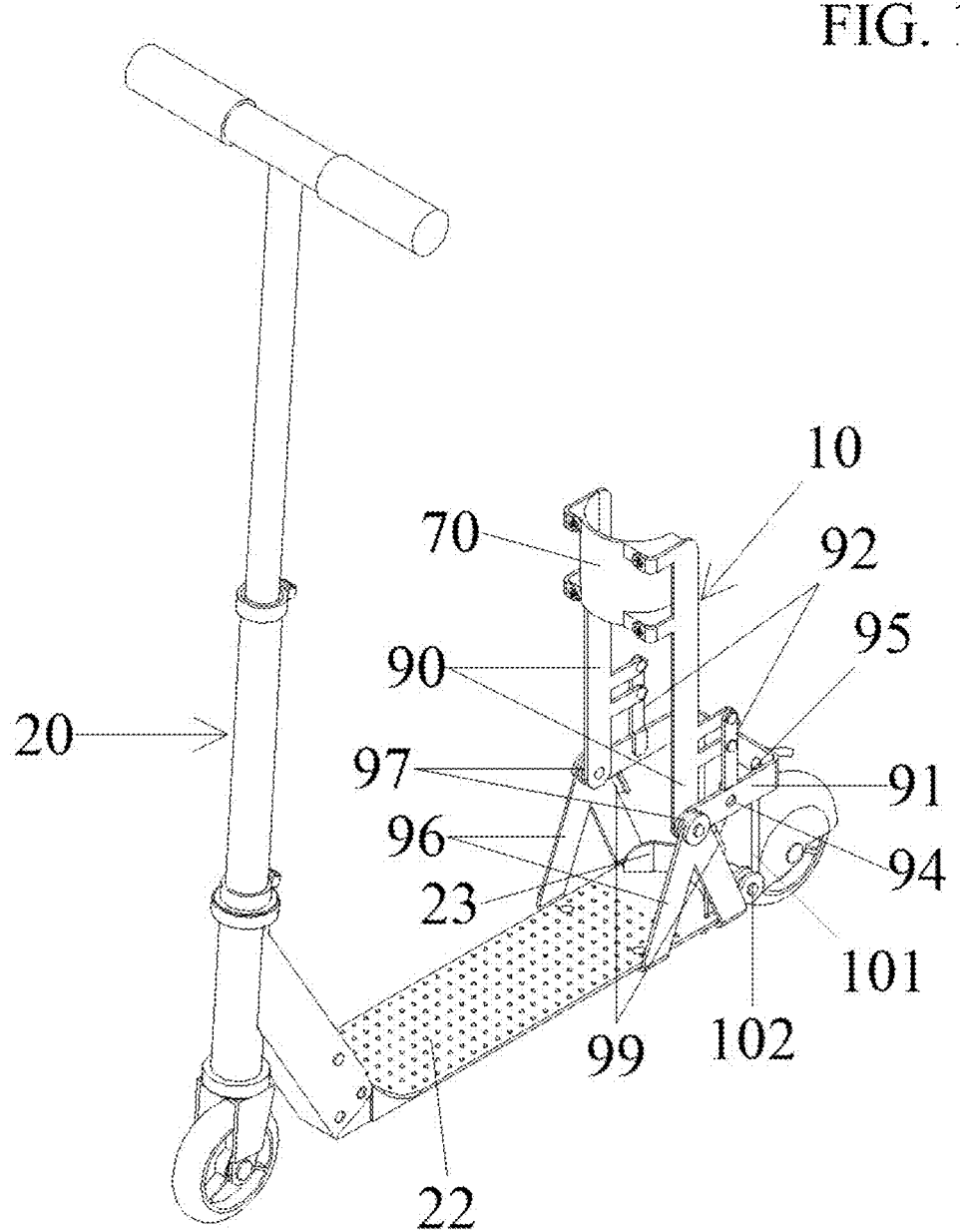
FIG. 18 is an isometric view of a third embodiment of the device, shown mounted on a kick scooter in accordance with the present invention.

FIG. 18 is an isometric view of a third embodiment of the device 10 in accordance with the present invention mounted on the platform 22 of a kick scooter 20. Shown are the leg bracket 70, arms 90, secondary arm 91, spring plates 92, one of the spring plate catch holes 94, one of the extension spring cord holes 95, base 96, pivot bushings 97, and secondary arm stops 99. Also shown is one of the extension spring cords 101 and one of the extension spring cord pulleys 102.

Figure 19:
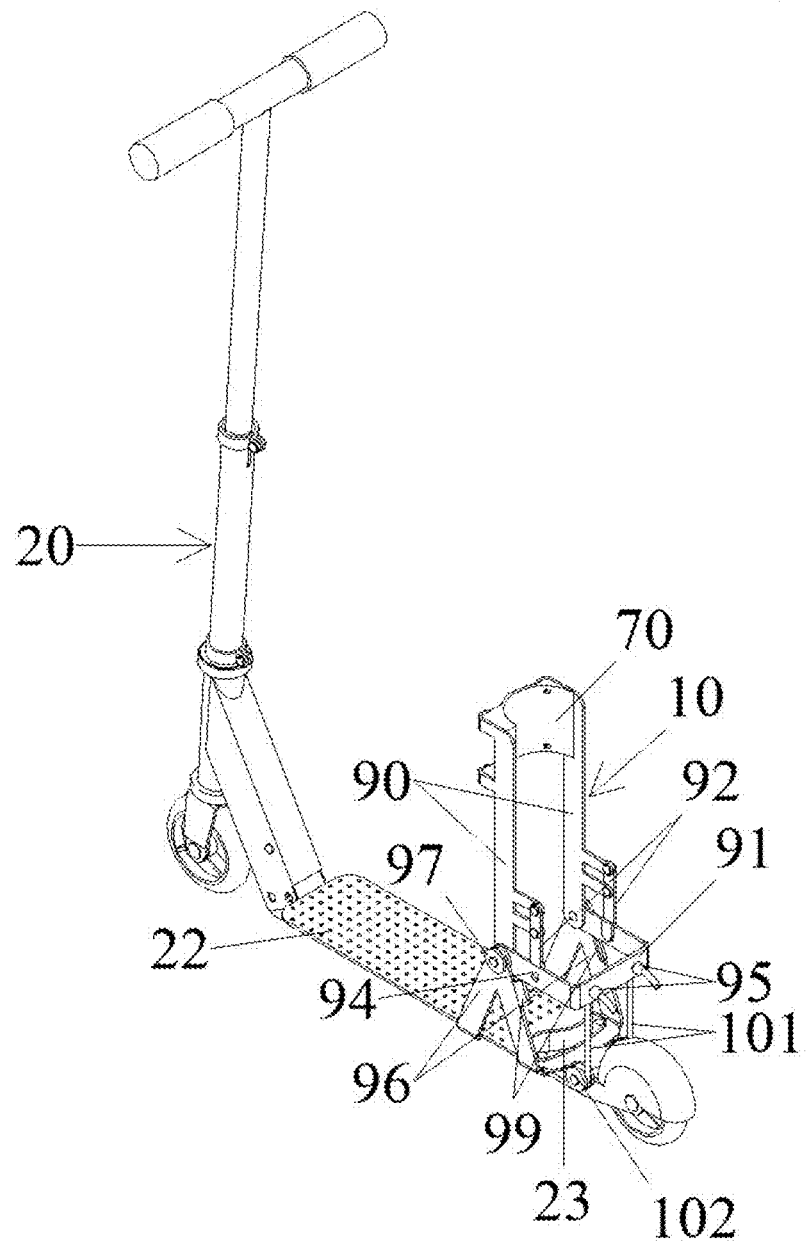
FIG. 19 is a reverse isometric view of the device of FIG. 18 mounted on a kick scooter in accordance with the present invention.

FIG. 19 is a reverse isometric view of the device 10 of FIG. 18 mounted on the platform 22 of a kick scooter 20. Shown are the leg bracket 70, arms 90, secondary arm 91, spring plates 92, one of the spring plate catch holes 94, the extension spring cord holes 95, base 96, one of the pivot bushings 97, and one of the secondary arm stops 99. Also shown are the extension spring cords 101, one of the extension spring cord pulleys 102, and the heel stop 23.

Figure 20:
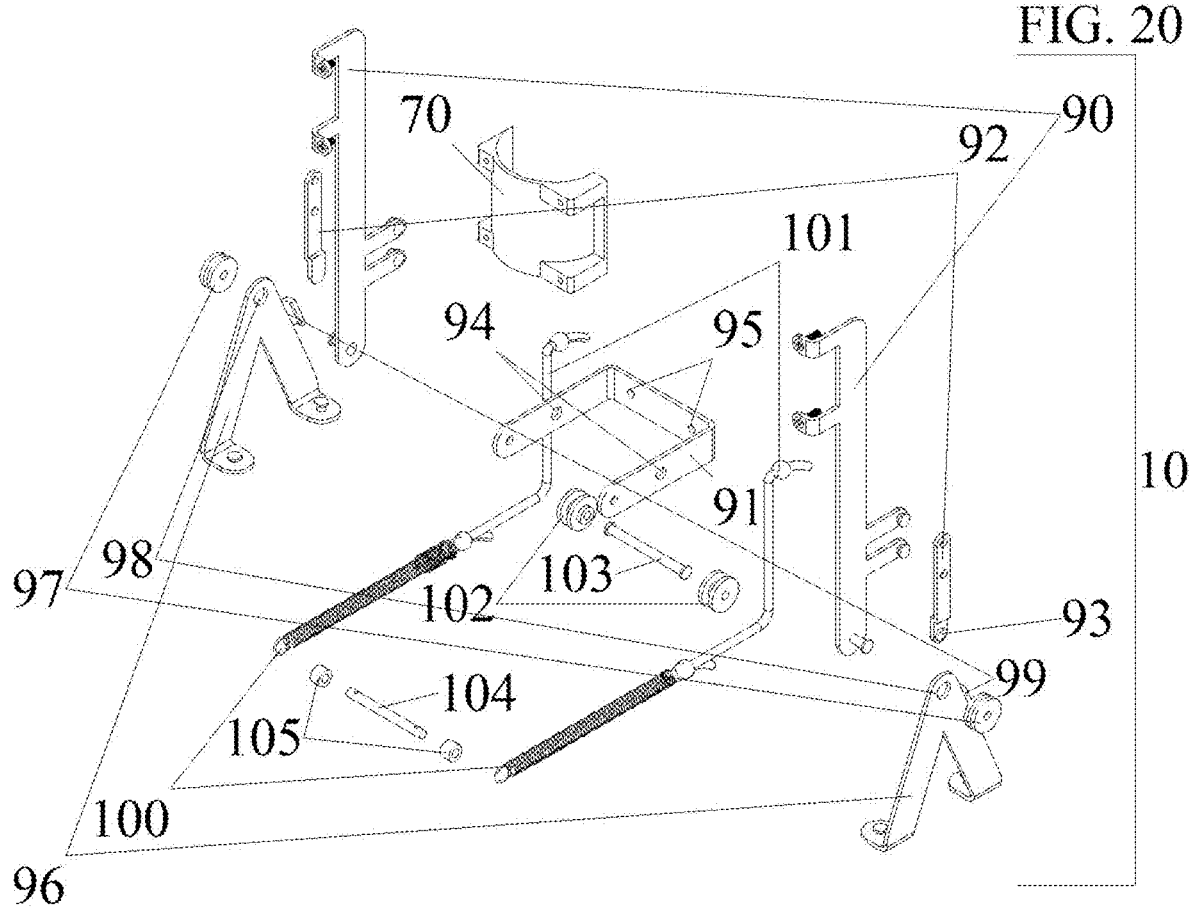
FIG. 20 is an exploded isometric view of the device of FIG. 18.

FIG. 20 is an exploded isometric view of the device 10 of FIG. 18 showing the leg bracket 70, arms 90, secondary arm 91, spring plates 92, one of the spring plate catches 93, the spring plate catch holes 94, the extension spring cord holes 95, base 96, pivot bushings 97, pivot holes 98, and secondary arm stops 99. Also shown are the extension springs 100, the extension spring cords 101, the extension spring cord pulleys 102, extension spring cord pulley axle 103, extension spring anchor rod 104, and extension spring anchor rod spacers 105.

Figure 21:
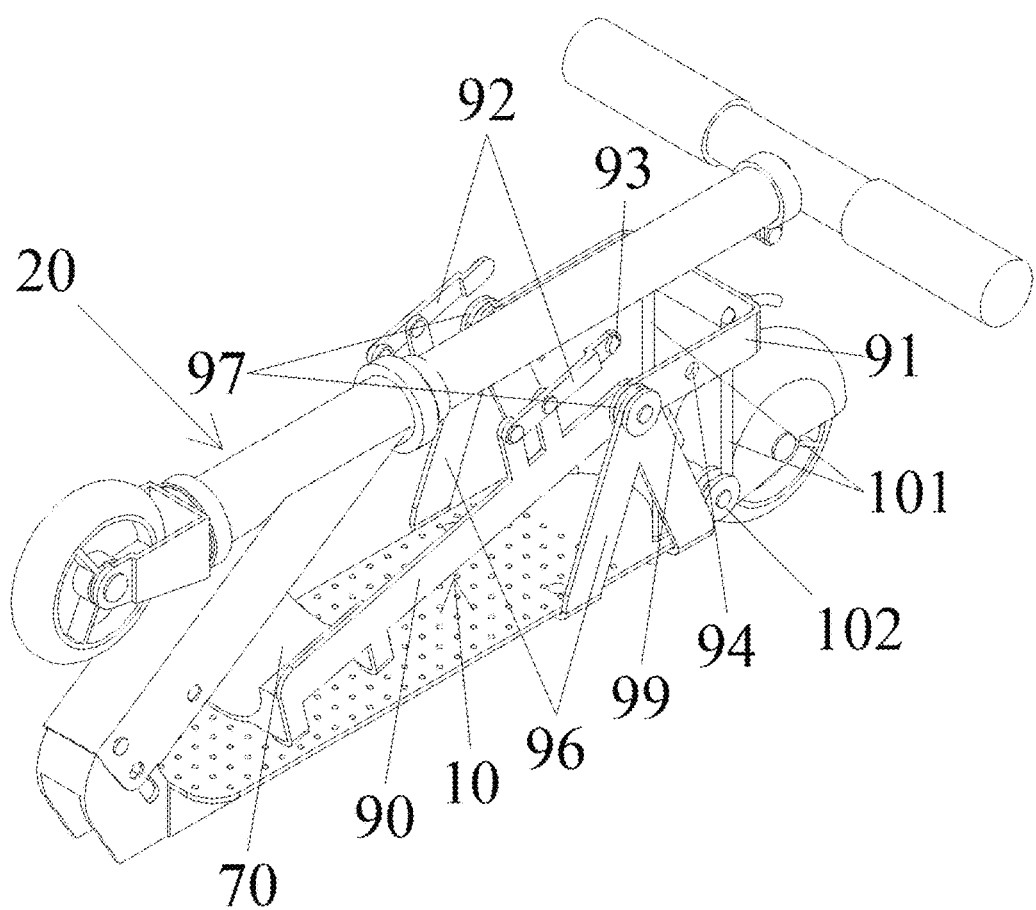
FIG. 21 is an isometric view of the device of FIG. 18 with the invention and kick scooter folded.

FIG. 21 is an isometric view of the device 10 of FIG. 18 with the invention and kick scooter 20 folded showing the leg bracket 70, one of the arms 90, the secondary arm 91, the spring plates 92, one of the spring plate catches 93, one of the spring plate catch holes 94, the base 96, the pivot bushings 97, and one of the secondary arm stops 99. Also shown are the extension spring cords 101 and one of the extension spring cord pulleys 102.

Figure 22:
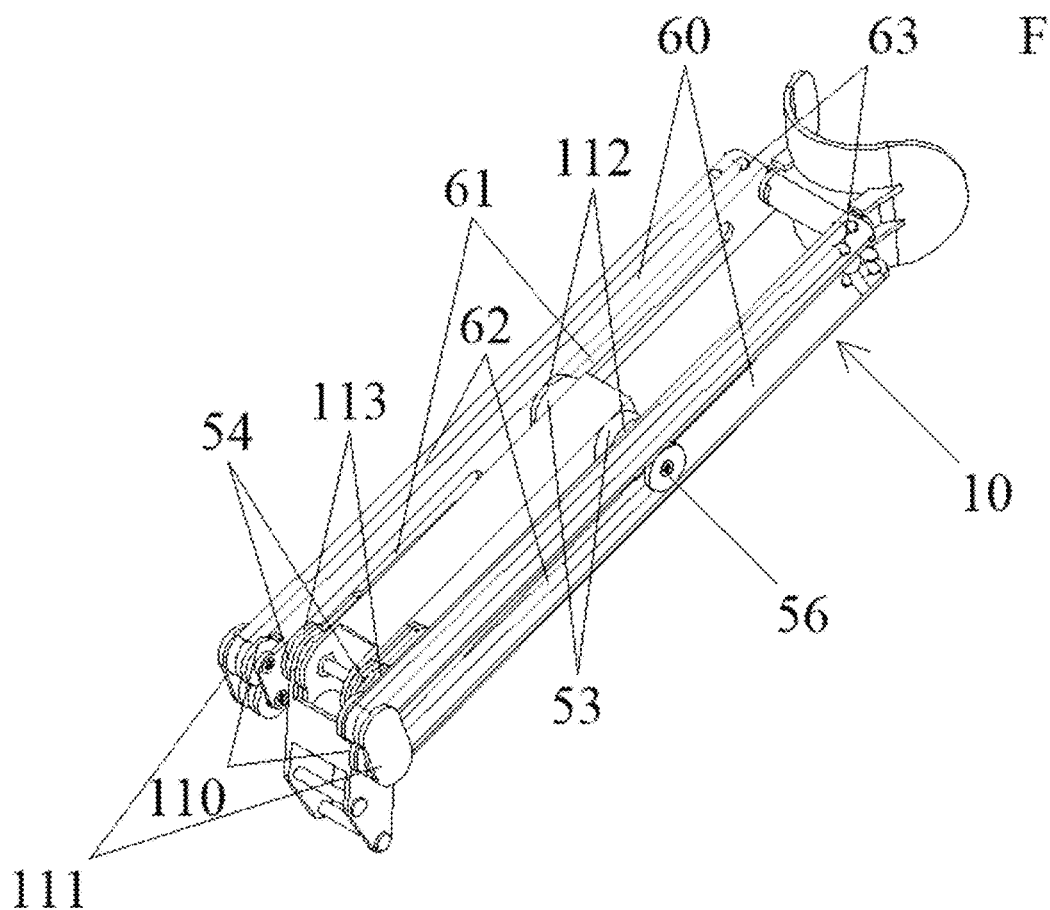
FIG. 22 is an isometric view of a fourth embodiment of the device in accordance with the present invention.

FIG. 22 is an isometric view of a fourth embodiment of the device 10 in accordance with the present invention showing the outer supports 60, shock cord 62, shock cord holes 63, shock cord pulleys 110, shock cord pulley supports 111, and one of the shock cord boss caps 56. Also shown are one of the slots 61, rear slot supports 53, rear slot support rollers 112, front slot supports 54, and front slot support rollers 113.

Figure 23:
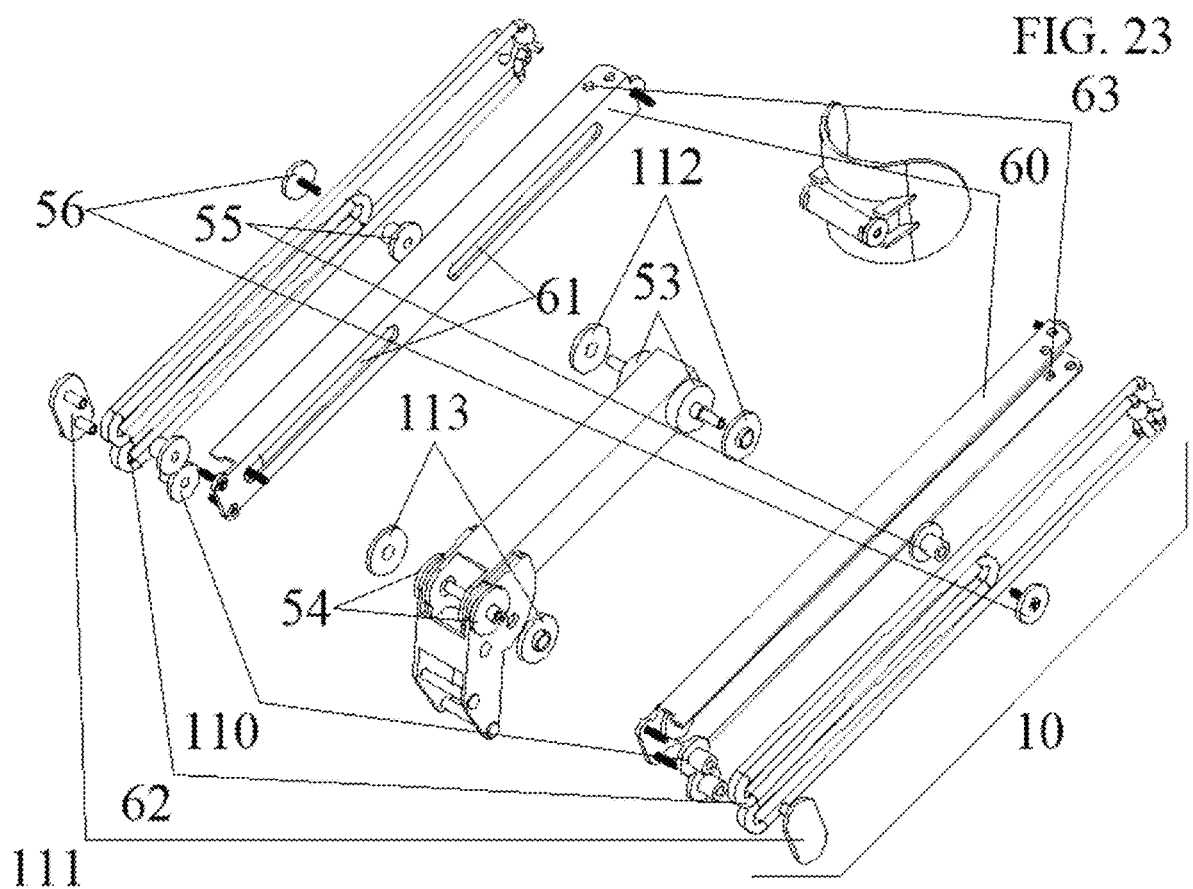
FIG. 23 is a partially exploded isometric view of the accessory of FIG. 22.

FIG. 23 is a partially exploded isometric view of the device 10 of FIG. 22 showing the outer supports 60, shock cord 62, shock cord holes 63, shock cord pulleys 110, shock cord pulley supports 111, shock cord bosses 55, and shock cord boss caps 56. Also shown are one of the slots 61, rear slot supports 53, rear slot support rollers 112, front slot supports 54, and front slot support rollers 113.

Figure 24:
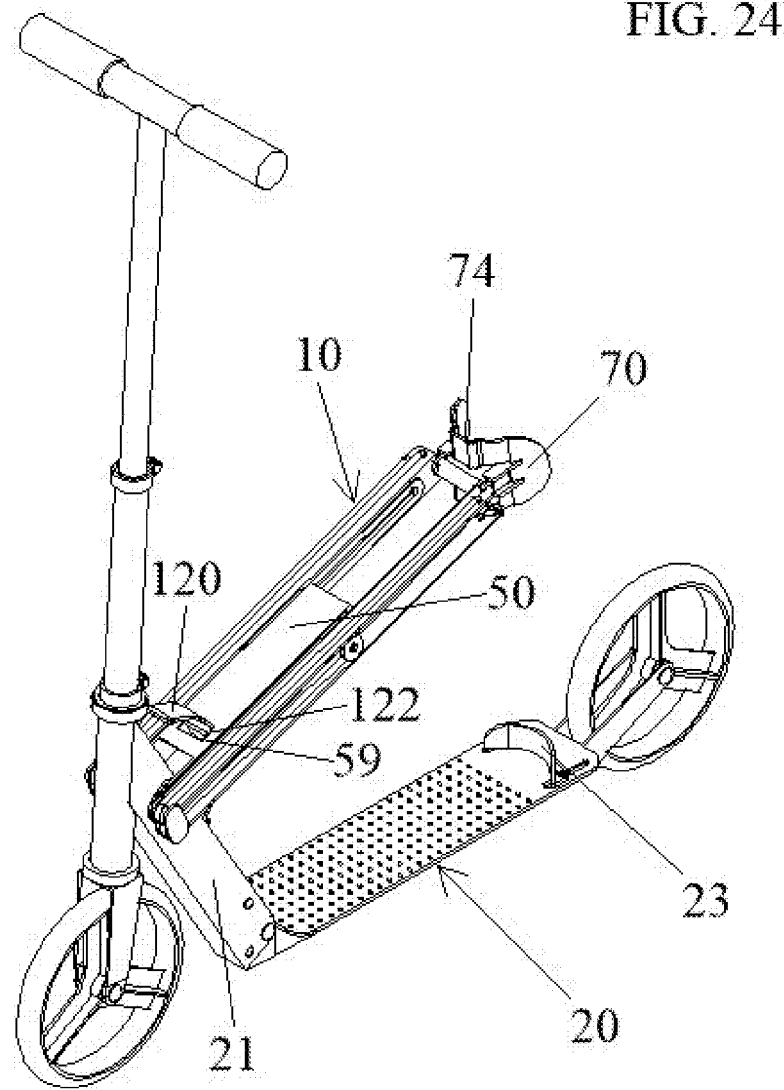
FIG. 24 is an isometric view of a fifth embodiment of the device, shown mounted on a kick scooter with the device in an upper position in accordance with the present invention.

FIG. 24 is an isometric view of a fifth embodiment of the device 10, in accordance with the present invention, mounted on the steering pivot support 21 of a kick scooter 20 with the device shown in an upper position. The angle of the device, relative to the steering pivot support, is being maintained by the engagement between the upper notch 122 of the latch/lateral support 120 and inner support latch/lateral support opening 59 in the inner support 50. Also shown is the heel stop 23, leg bracket 70, and leg bracket channel 74.

Figure 25:
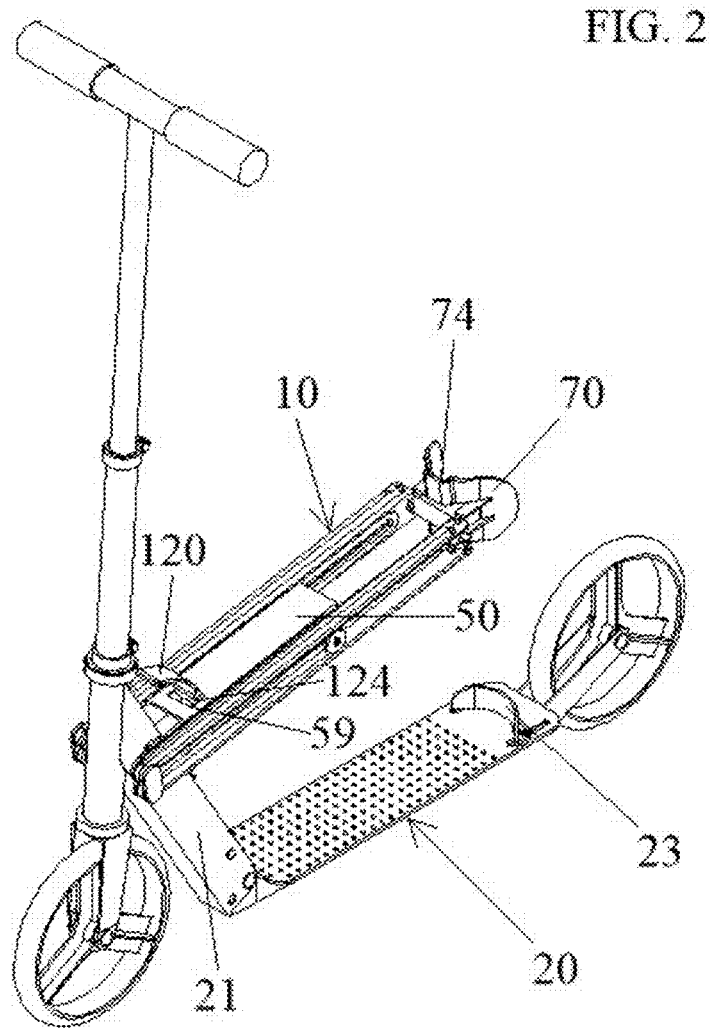
FIG. 25 is an isometric view of the device of FIG. 24, shown mounted on a kick scooter with the device in a lower position in accordance with the present invention.

FIG. 25 is an isometric view of a fifth embodiment of the device 10, shown mounted on the steering pivot support 21 of a kick scooter 20 with the device shown in a lower position. The angle of the device, relative to the steering pivot support, is being maintained by the engagement between the lower notch 124 of the latch/lateral support 120 and inner support latch/lateral support opening 59 in the inner support 50. Also shown is the heel stop 23, leg bracket 70, and leg bracket channel 74.

Figure 26:
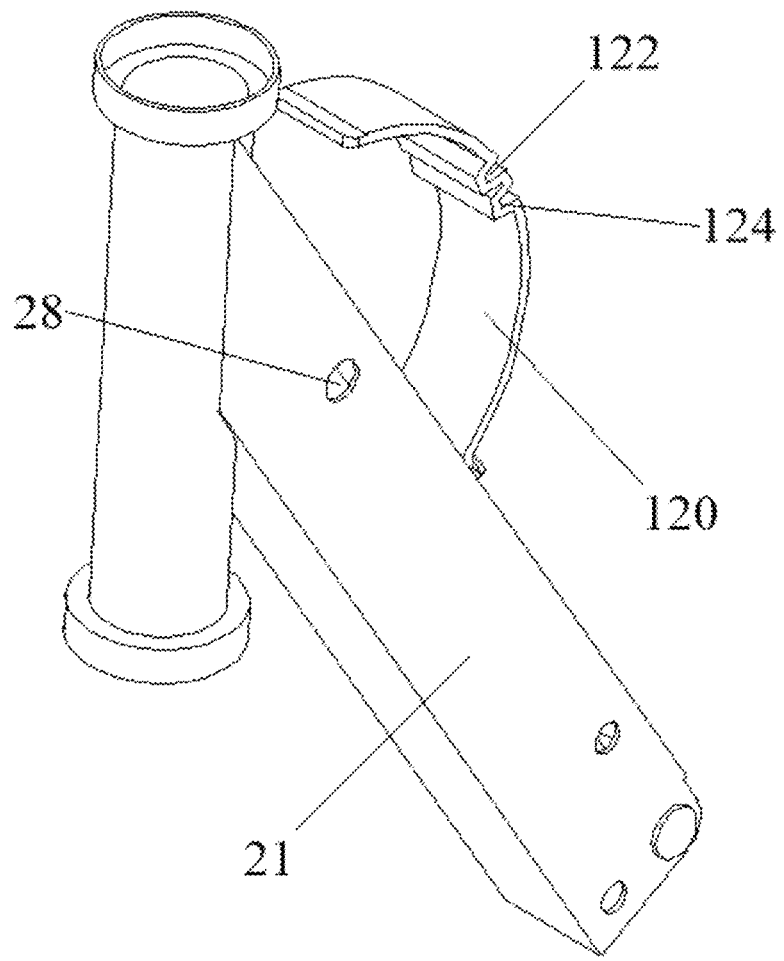
FIG. 26 is an isometric view of the latch/lateral support of the device of FIG. 24 and kick scooter steering pivot support.

FIG. 26 is an isometric view of the latch/lateral support 120 of the device of FIG. 24 and kick scooter steering pivot support 21, showing the upper notch 122, lower notch 124, and steering pivot support lateral through hole 28.

Figure 27:
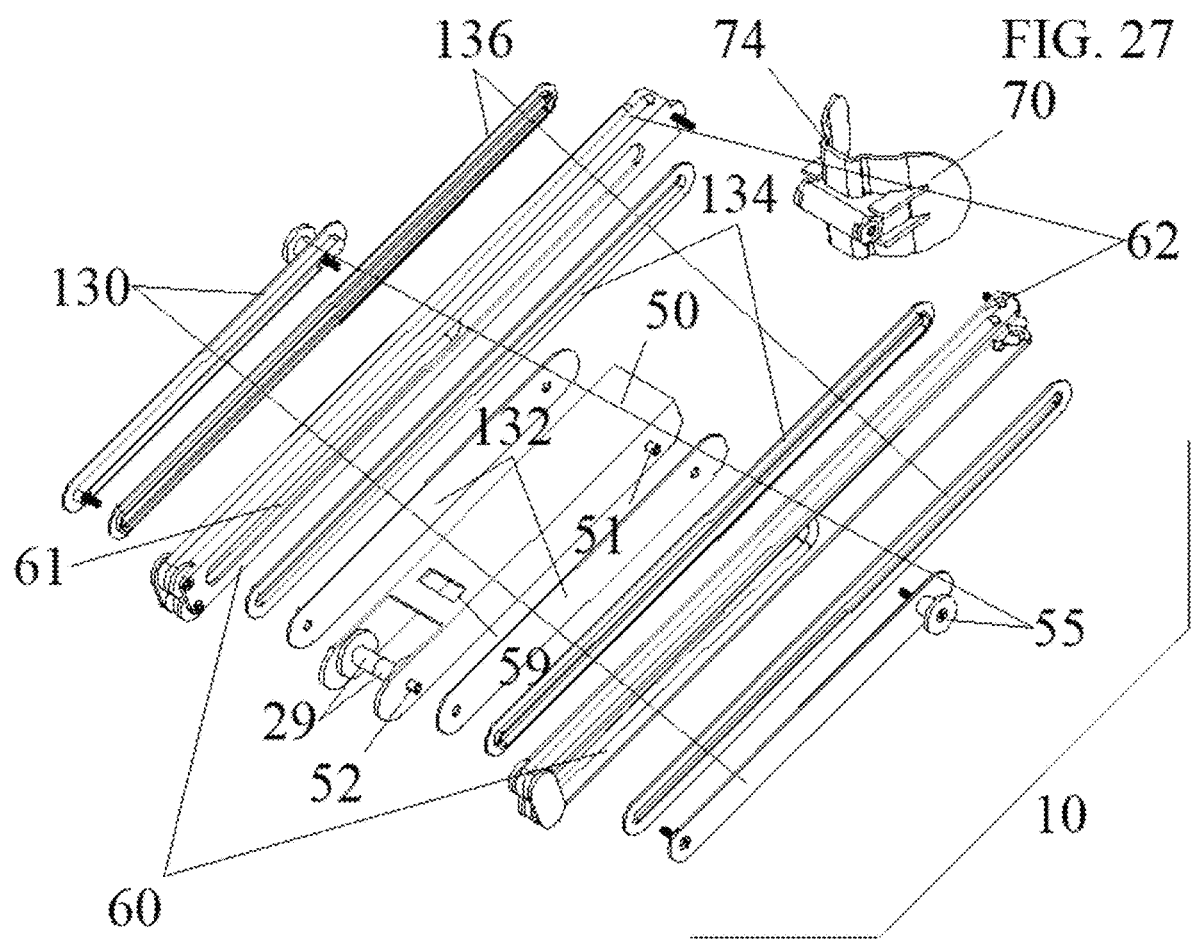
FIG. 27 is a partially exploded isometric view of the device of FIG. 24.

FIG. 27 is a partially exploded isometric view of the device 10 of FIG. 24, showing the inner support 50, inner support front through rod 52, inner support rear through rod 51, steering pivot support lateral through hole bushings 29 and inner support latch/lateral support opening 59. Also shown are the outer supports 60, bosses 55, shock cord 62, the slot 61 in the far most outer support (the slot in the near most outer support is obscured by the walls of the support), slot supports 130, slide plates 132, inner slot liners 134, outer slot liners 136, leg bracket 70, and leg bracket channel 74.

Figure 28:
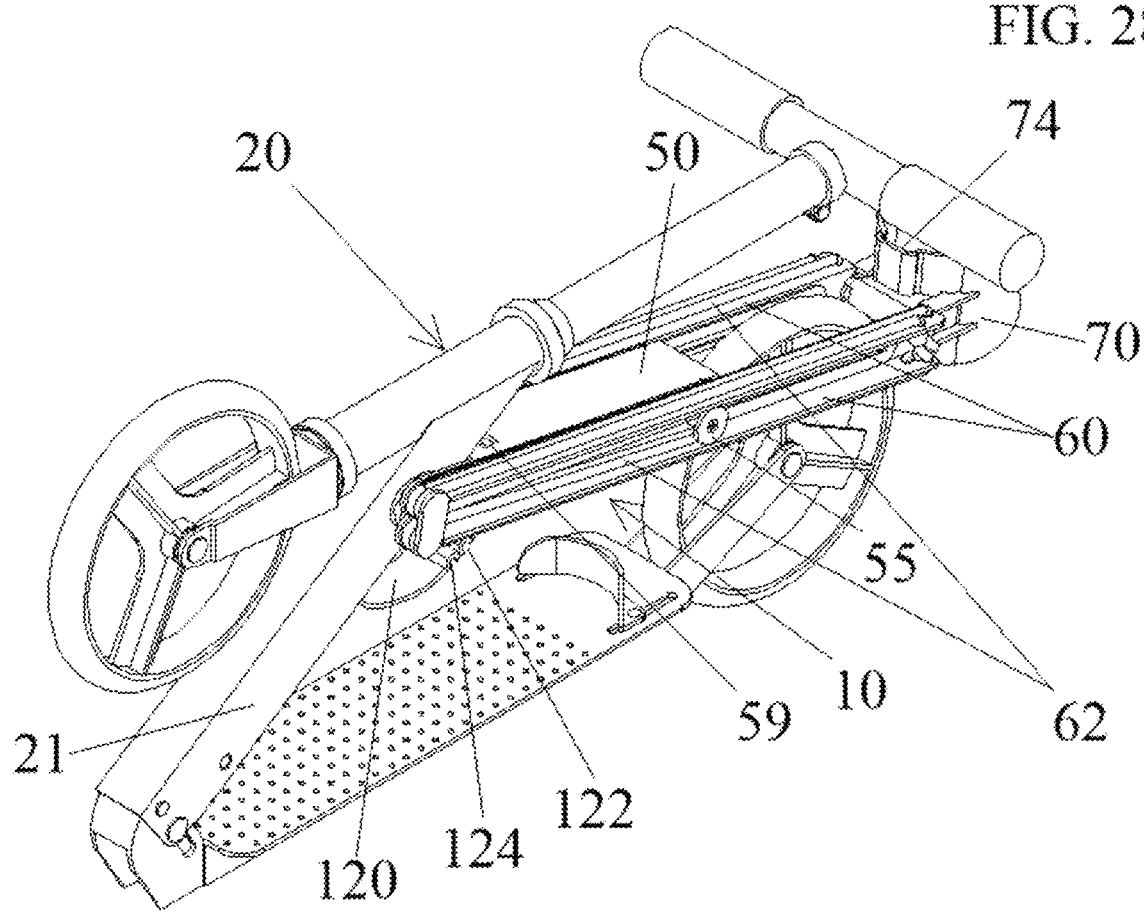
FIG. 28 is an isometric view of the device of FIG. 24 with the invention and kick scooter, shown in a folded position.

FIG. 28 is an isometric view of the device 10 of FIG. 24 with the invention and kick scooter folded, showing the steering pivot support 21, inner support 50, inner support latch/lateral support opening 59, latch/lateral support 120, upper notch 122, and lower notch 124. Also shown are the outer supports 60, shock cord 62, one of the shock cord bosses 55, leg bracket 70, and leg bracket channel 74.

Figure 29:
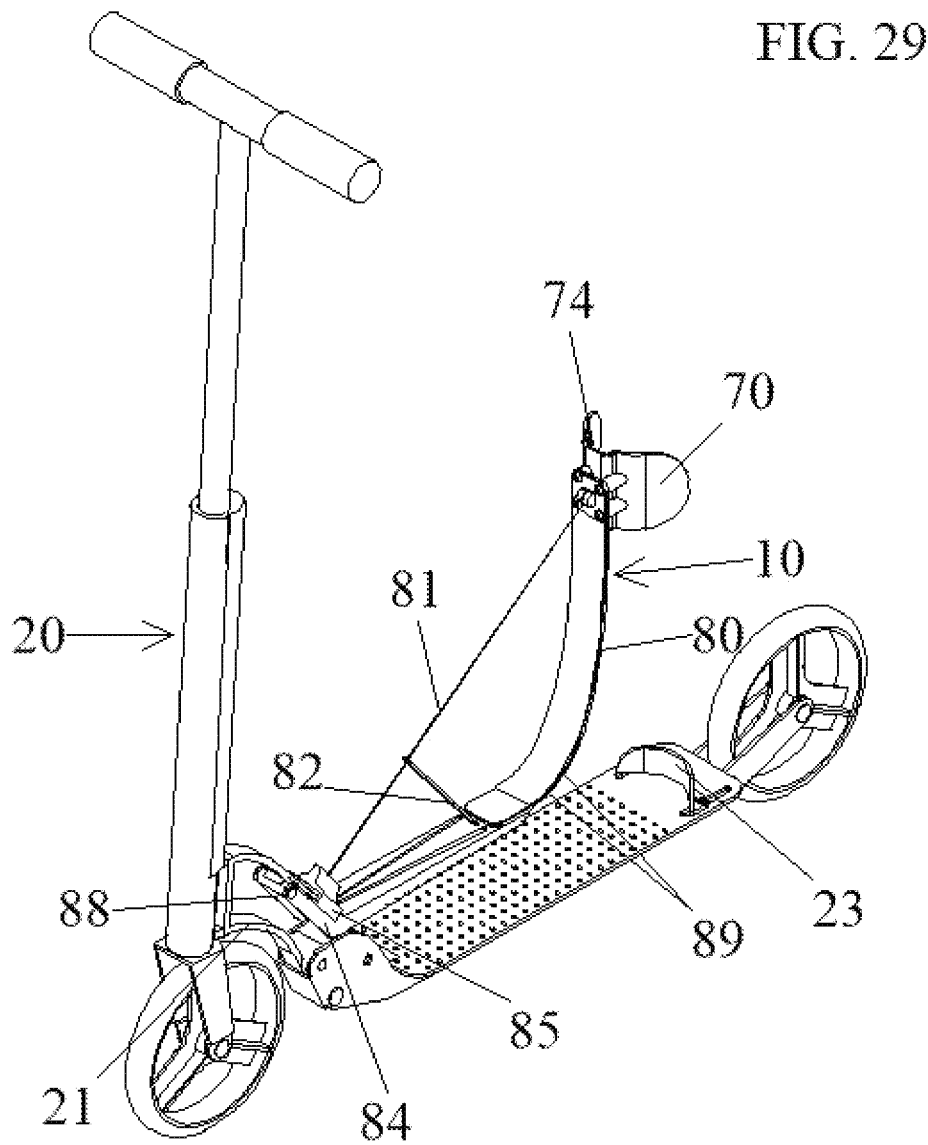
FIG. 29 is an isometric view of a sixth embodiment of the device, shown mounted on a kick scooter in accordance with the present invention.

FIG. 29 is an isometric view of a sixth embodiment of the device 10 in accordance with the present invention, mounted on the steering pivot support 21 of a kick scooter 20. Shown are the leg bracket 70, leg bracket channel 74, flexible resilient strip 80, supplemental flexible resilient strips 89, preload cord 81, take-up cord 82, hinged component 84, hinged component axle 88, preload cord attachment 85, and heel stop 23.

Figure 30:
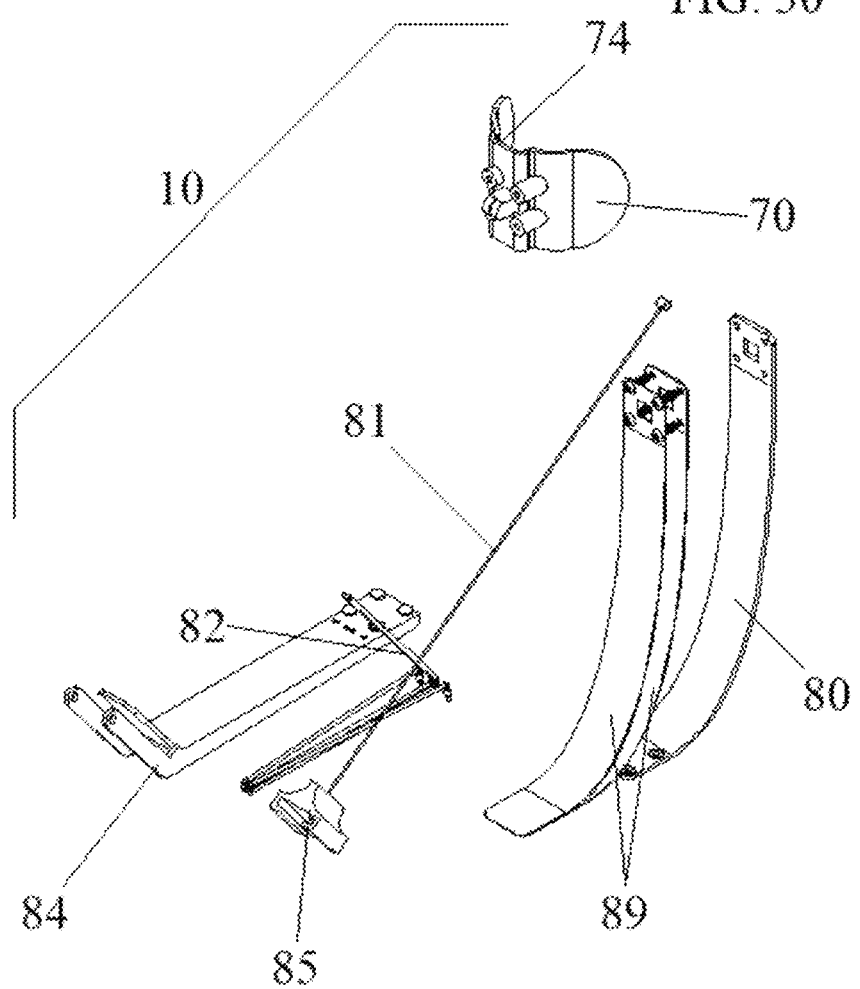
FIG. 30 is an exploded isometric view of the device of FIG. 29.

FIG. 30 is an exploded isometric view of the device 10 of FIG. 29 showing the leg bracket 70, leg bracket channel 74, flexible resilient strip 80, supplemental flexible resilient strips 89, preload cord 81, take-up cord 82, hinged component 84, and preload cord attachment 85.

Figure 31:
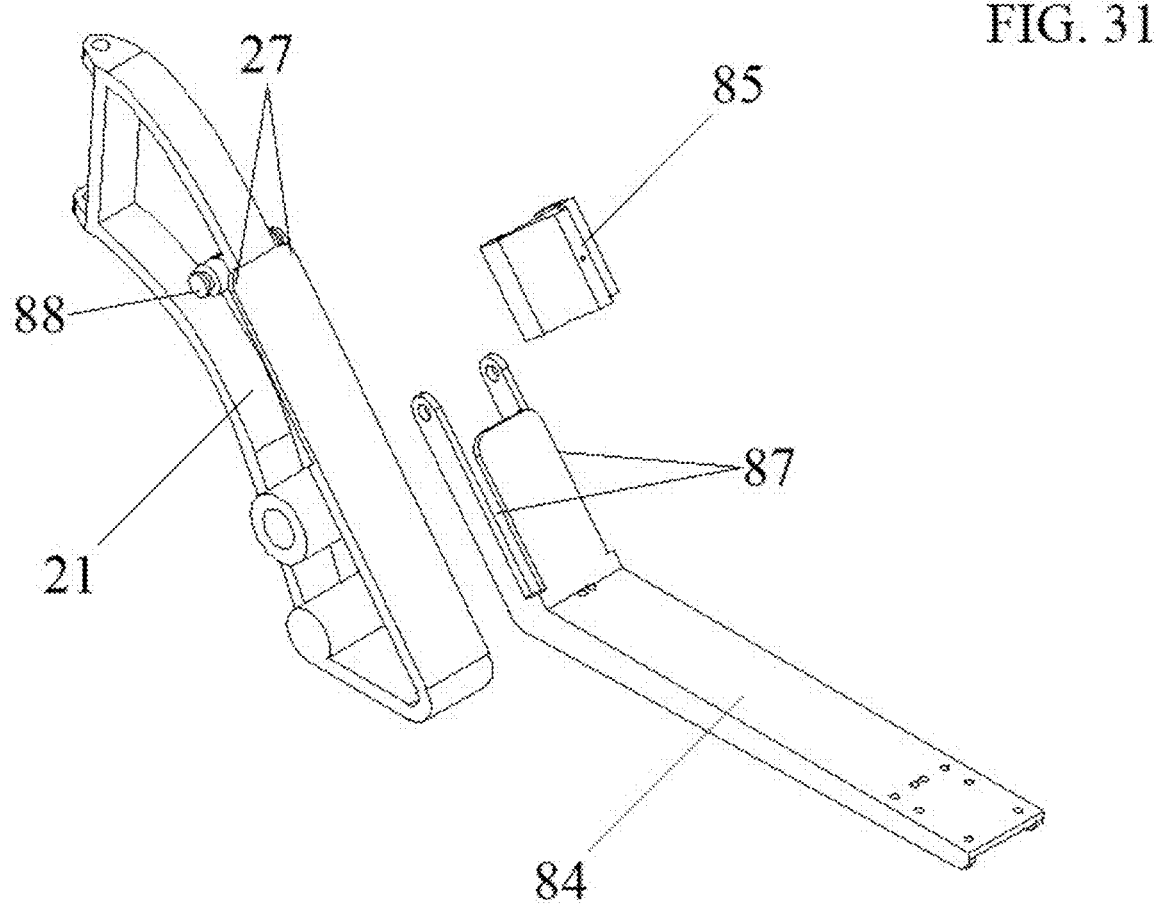
FIG. 31 is a reverse isometric view of the hinged component of the device of FIG. 29, kick scooter steering pivot support, and preload cord attachment.

FIG. 31 is a reverse isometric view of the hinged component 84 of the device of FIG. 29, kick scooter steering pivot support 21, and preload cord attachment 85. Also shown are the hinged component axle 88, hinged component slots 87, and steering pivot support lateral extensions 27.

Figure 32:
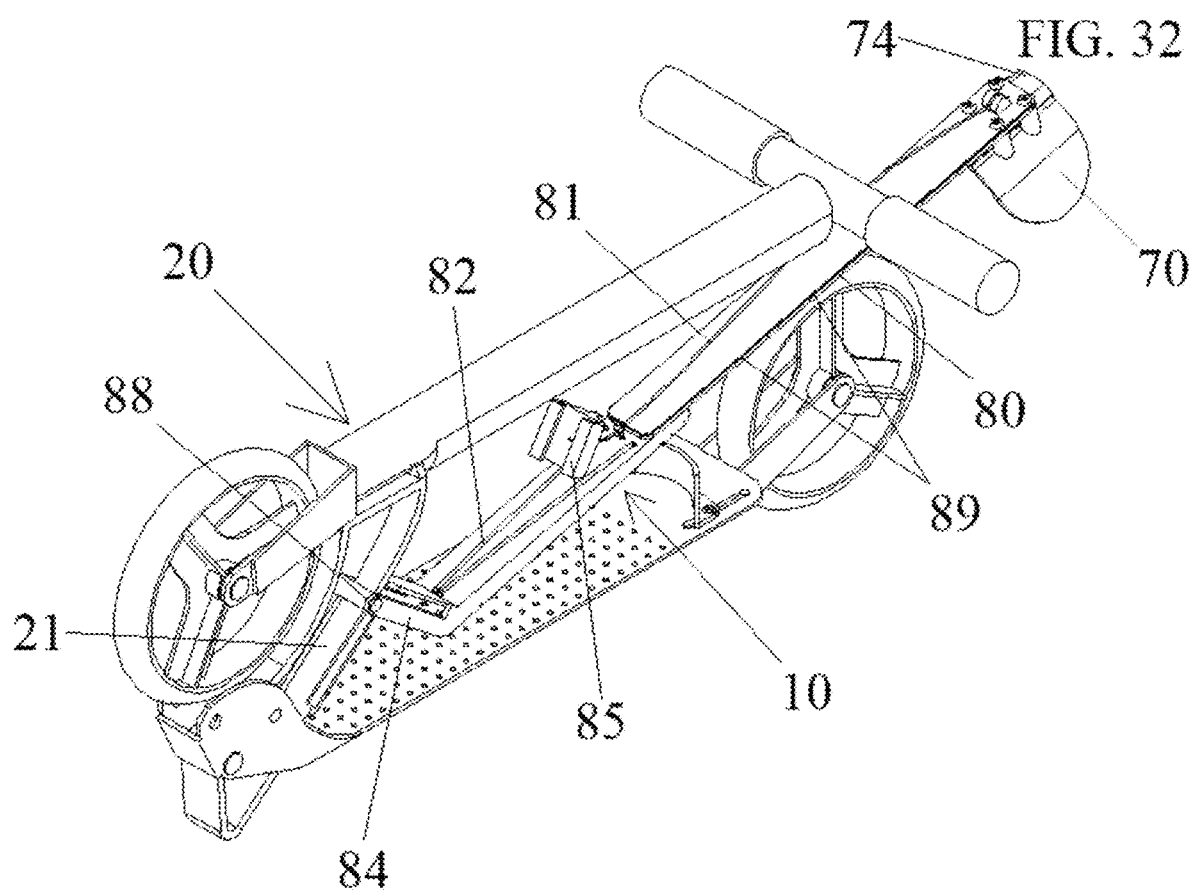
FIG. 32 is an isometric view of the kick scooter and device of FIG. 29, shown in a folded position.

FIG. 32 is an isometric view of the device 10 of FIG. 29 with the invention and kick scooter 20 folded showing the leg bracket 70, leg bracket channel 74, flexible resilient strip 80, supplemental flexible resilient strips 89, preload cord 81, take-up cord 82, hinged component 84, hinged component axle 88, and preload cord attachment 85. Also shown is the kick scooter's steering pivot support 21.

Figure 33:
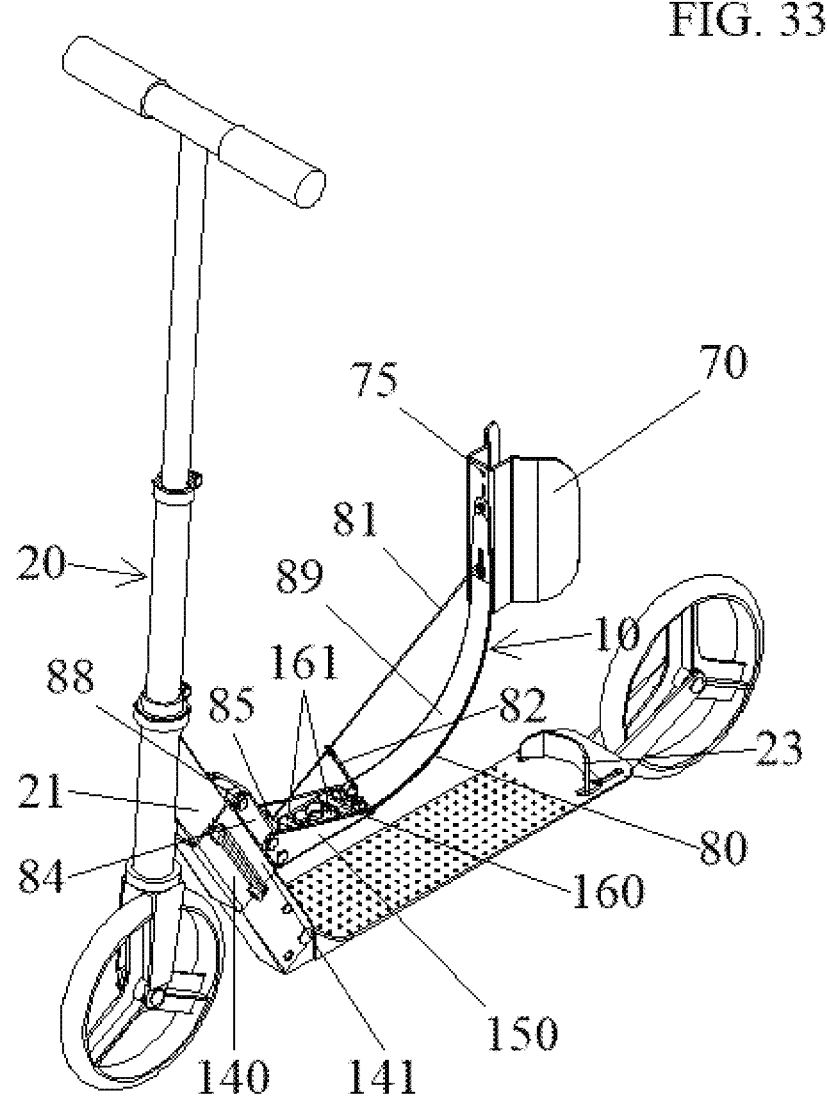
FIG. 33 is an isometric view of a seventh embodiment of the device, shown mounted on a kick scooter, in accordance with the present invention.

FIG. 33 is an isometric view of a seventh embodiment of the device 10, shown mounted on a kick scooter 20, in accordance with the present invention showing the leg bracket 70, one of the leg bracket height adjustment holes 75, flexible resilient strip 80, one of the supplemental flexible resilient strips 89, flexible resilient strip screw plate 160, take-up cord guide surfaces 161, preload cord 81, take-up cord 82, hinged component 84, hinged component extension 150, hinged component axle 88, preload cord attachment 85, clamp lower half 140, clamp upper half 141, steering pivot support 21, and heel stop 23.

Figure 34:
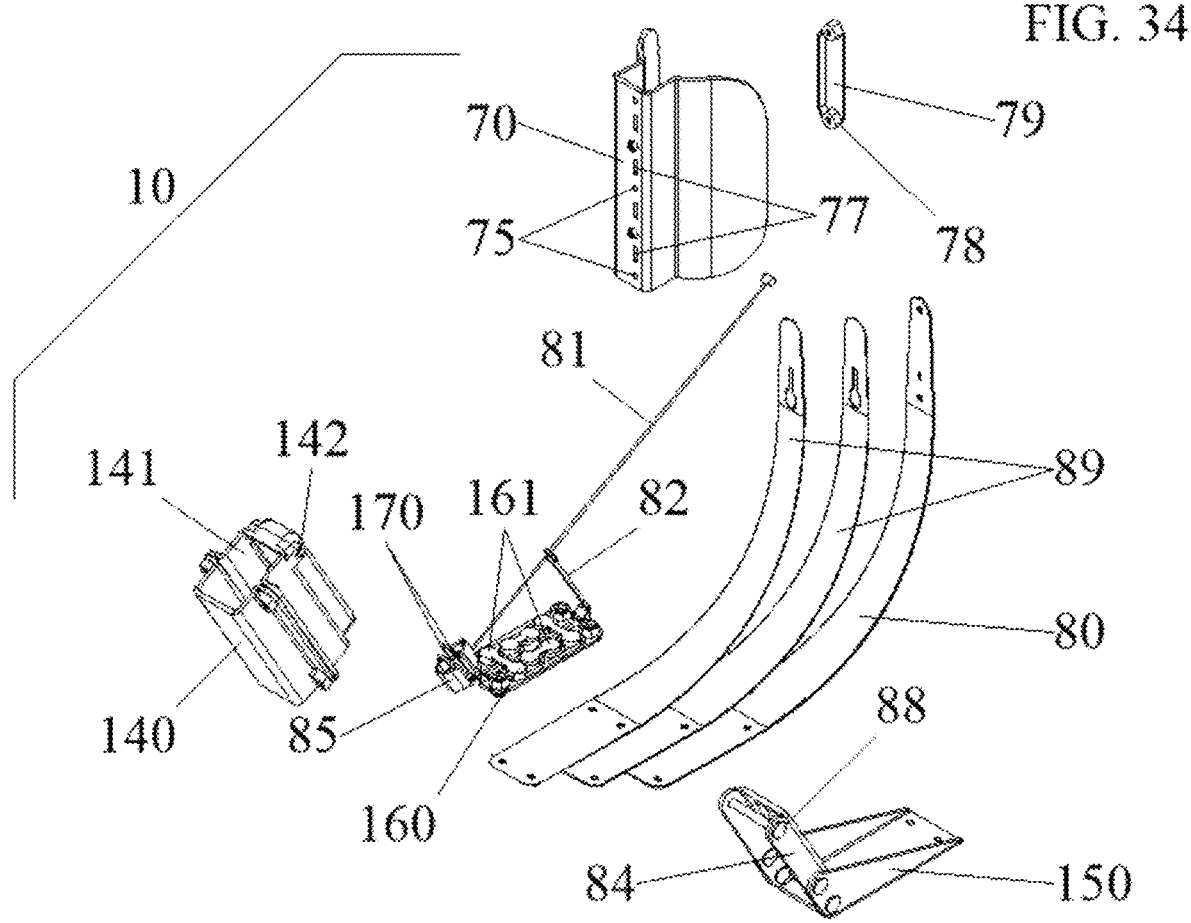
FIG. 34 is a partially exploded isometric view of the device of FIG. 33.

FIG. 34 is a partially exploded isometric view of the device 10 of FIG. 33 showing the leg bracket 70, leg bracket height adjustment holes 75, preload cord openings 77, leg bracket screw plate 78, preload cord end cover 79, flexible resilient strip 80, supplemental flexible resilient strips 89, flexible resilient strip screw plate 160, take-up cord guide surfaces 161, preload cord 81, take-up cord 82, hinged component 84, hinged component axle 88, hinged component extension 150, preload cord attachment 85, clamp lower half 140, clamp upper half 141, and clamp axle hole 142.

Figure 35:
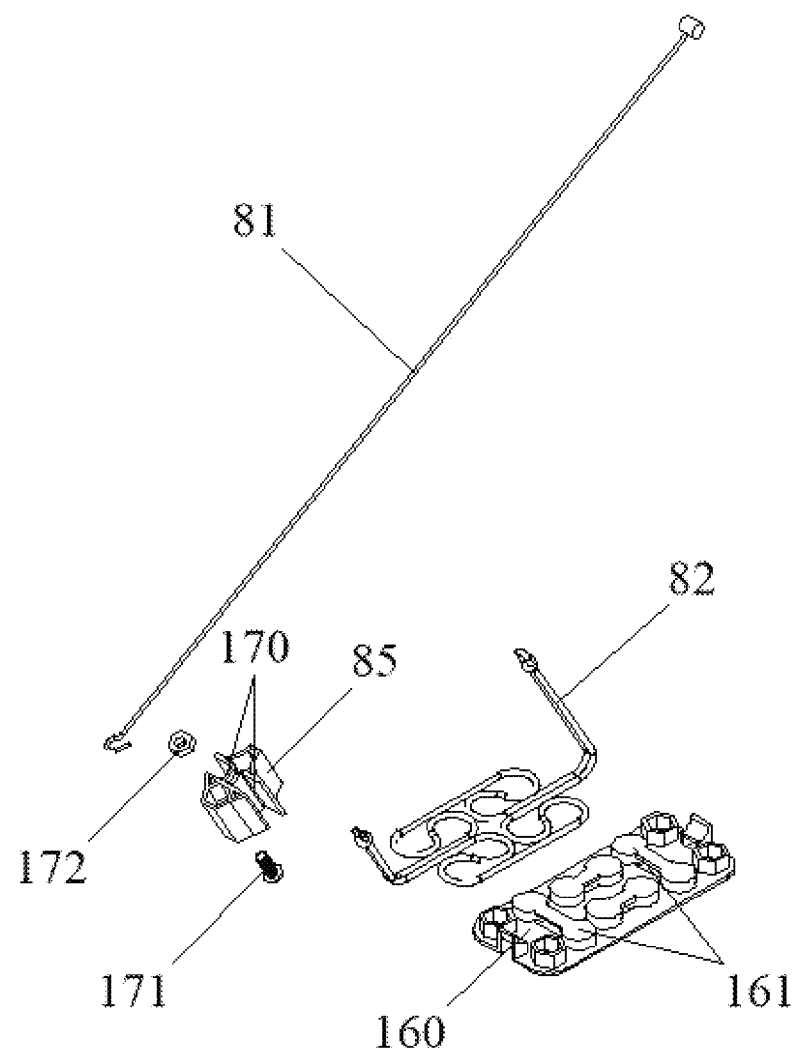
FIG. 35 is an exploded isometric view of the preload cord, take-up cord, flexible resilient strip screw plate, and preload cord attachment of the device of FIG. 33.

FIG. 35 is an exploded isometric view of the preload cord 81, take-up cord 82, flexible resilient strip screw plate 160, and preload cord attachment 85 of the device of FIG. 33 also showing the take-up cord guide surfaces 161, preload cord attachment channels 170, preload cord anchor screw 171, and preload cord anchor nut 172.

Figure 36:
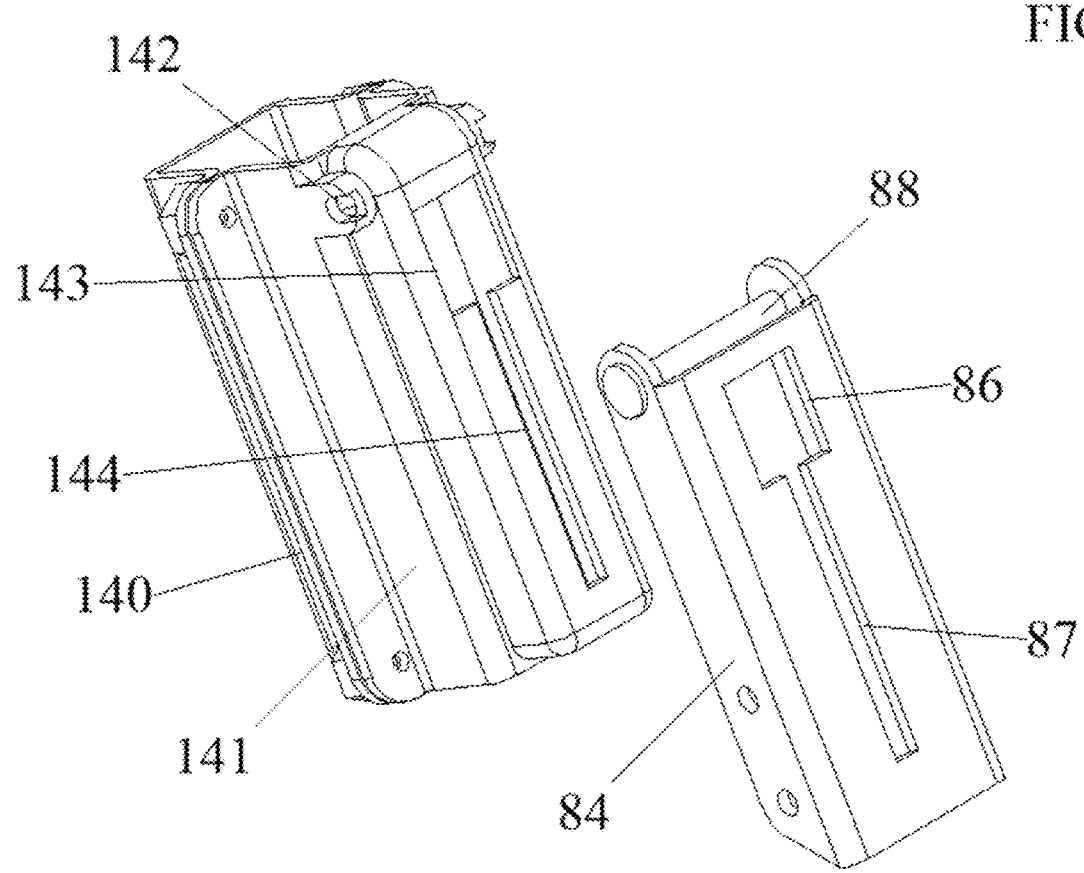
FIG. 36 is a partially exploded reverse isometric view of the clamp lower half, clamp upper half, and hinged component of the device of FIG. 33.

FIG. 36 is a partially exploded reverse isometric view of the clamp lower half 140, clamp upper half 141, and hinged component 84 of the device of FIG. 33 also showing the clamp axle hole 142, clamp opening 143, clamp slot 144, hinged component axle 88, hinged component opening 86, and hinged component slot 87.

Figure 37:
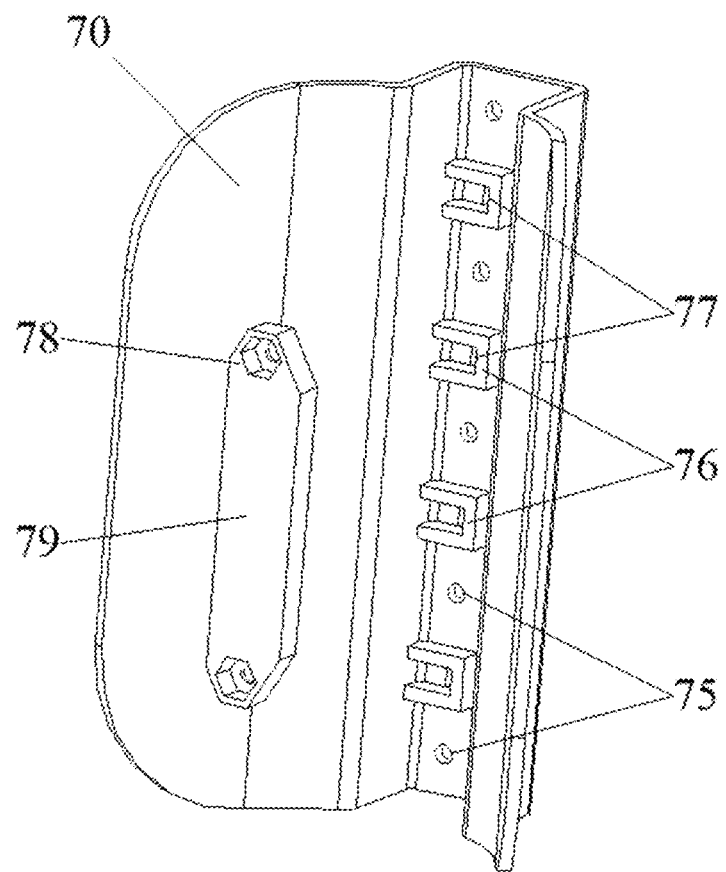
FIG. 37 is an exploded view of the backside of the leg bracket and leg bracket screw plate of the device of FIG. 33.

FIG. 37 is an exploded view of the backside of the leg bracket 70 and leg bracket screw plate 78 of the device of FIG. 33 also showing the leg bracket height adjustment holes 75, preload cord end cradles 76, preload cord openings 77, and preload cord end cover 79.

Figure 38:
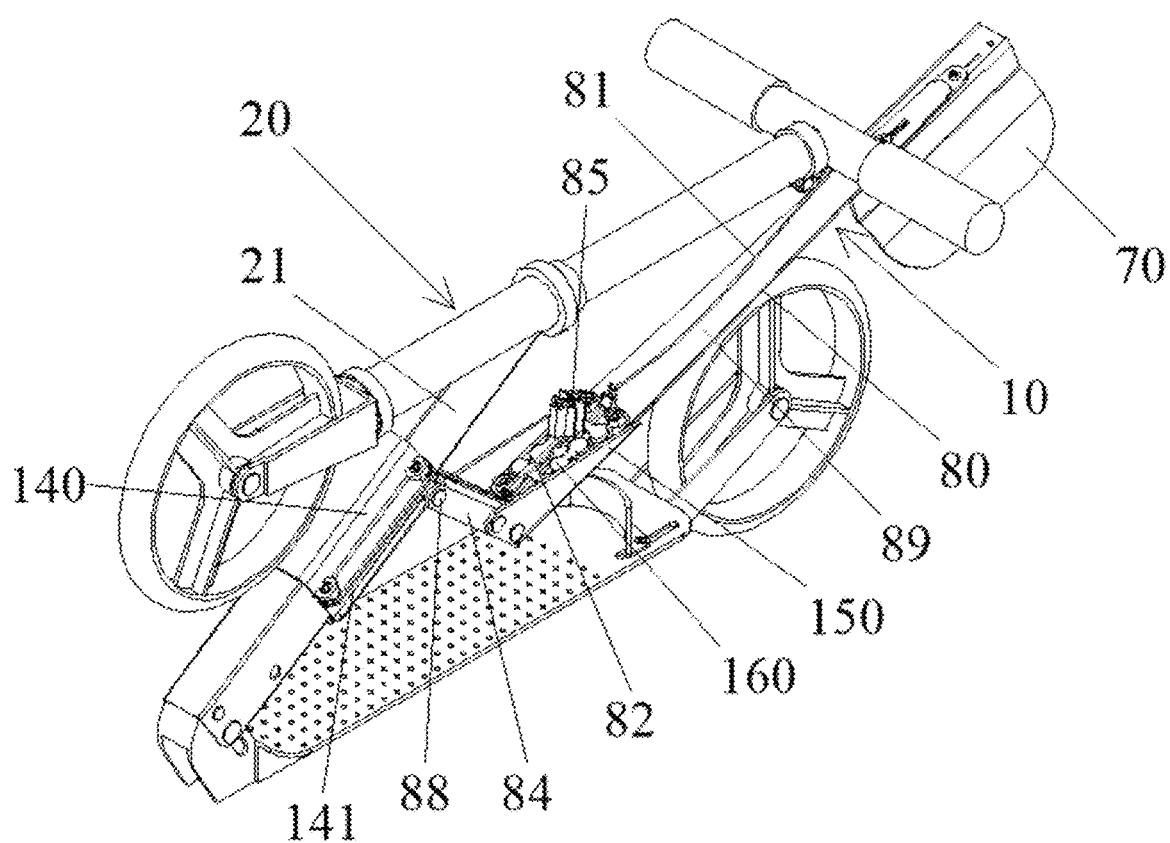
FIG. 38 is an isometric view of the kick scooter and device of FIG. 33, in a folded position.

FIG. 38 is an isometric view of the kick scooter 20 and device 10 of FIG. 33, in a folded position showing the steering pivot support 21, clamp lower half 140, clamp upper half 141, leg bracket 70, flexible resilient strip 80, one of the supplemental flexible resilient strips 89, flexible resilient strip screw plate 160, preload cord 81, take-up cord 82, hinged component 84, hinged component extension 150, hinged component axle 88, and preload cord attachment 85.

REFERENCE NUMERALS 10 kick scooter performance enhancing device
20 kick scooter
21 steering pivot support
22 platform
23 heel stop
24 heel stop slot
25 steering pivot support opening
26 steering pivot support slot
27 steering pivot support lateral extension
28 steering pivot support lateral through hole
29 steering pivot support lateral through hole bushing
30 rider
31 support leg
32 kicking leg
40 connector
42 lock pin
43 lock pin spring
44 lock pin holes
50 inner support
51 inner support rear through rod
52 inner support front through rod
53 rear slot support
54 front slot support
55 shock cord boss
56 shock cord boss cap
57 front slot retainer
58 pivot plate
59 inner support latch/lateral support opening
60 outer support
61 slot
62 shock cord
63 shock cord hole 70 leg bracket
71 leg bracket bushing
72 leg bracket axle
73 leg bracket stop
74 leg bracket channel
75 Leg bracket height adjustment holes
76 Preload cord end cradle
77 Preload cord opening
78 Leg bracket screw plate
79 Preload cord end cover
80 flexible resilient strip
81 preload cord
82 take-up cord
83 cord sleeve
84 hinged component
85 preload cord attachment
86 hinged component opening
87 hinged component slot
88 hinged component axle
89 supplemental flexible resilient strip
90 arm
91 secondary arm
92 spring plate
93 spring plate catch
94 spring plate catch hole
95 extension spring cord hole
96 base
97 pivot bushing
98 pivot hole
99 secondary arm stop
100 extension spring
101 extension spring cord
102 extension spring cord pulley
103 extension spring cord pulley axle
104 extension spring anchor rod
105 extension spring anchor rod spacer
110 shock cord pulley
111 shock cord pulley support
112 rear slot support roller
113 front slot support roller
120 latch/lateral support
122 upper notch
124 lower notch
130 slot support
132 slide plate
134 inner slot liner
136 outer slot liner
140 Clamp lower half
141 Clamp upper half
142 Clamp axle hole
143 Clamp opening
144 Clamp slot
150 Hinged component extension
160 Flexible resilient strip screw plate
161 Take-up cord guide surface
170 Preload cord attachment channel
171 Preload cord anchor screw
172 Preload cord anchor nut An exemplary embodiment of a kick scooter performance enhancing device 10 in accordance with the present invention is shown in FIGS. 1-13. The exemplary device 10 includes a connector 40 with one end affixed to the steering pivot support 21 of a kick scooter 20, FIGS. 2 and 6. The other end supports the front end of an inner support 50 via an inner support front through rod 52, FIGS. 3 and 5. This rod also supports front slot supports 54 extending transversely from either side of the connector, FIGS. 2, 3, and 5.

The rear end of the inner support 50 supports an inner support rear through rod 51, FIGS. 3 and 5. This rod supports rear slot supports 53 extending transversely from either side of the inner support, FIGS. 2, 3 and 5.

Each side of the front end of the inner support 50 is separated from the inner surface of the connector 40 by a pivot plate 58, FIG. 3. These plates house two lock pins 42 which are pushed outward by a lock pin spring 43 and engage lock pin holes 44 in the side walls of the connector 40, FIGS. 3 and 5. The lateral walls of the connector and, when in use, the pivot plates extend a significant distance to the rear of the front through rod 52, FIGS. 3 and 5.

The exemplary device also includes two outside supports 60, each featuring a longitudinal slot 61, FIGS. 2, 4, and 5. The front portion of each slot is supported by one of the front slot supports 54, FIGS. 2 and 5. Front slot retainers 57 are affixed to either end of the inner support front through rod 52 supporting these slot supports, FIGS. 4 and 5. The rear portion of each slot is supported by the corresponding rear slot support 53, FIGS. 2 and 5. Shock cord bosses 55 and shock cord boss caps 56 are affixed to each end of the inner support rear through rod 51 supporting these slot supports, FIGS. 4 and 5.

For each outside support 60, one end of a continuous strand of shock cord 62 is threaded through one of the shock cord holes 63 and knotted, FIGS. 2, 4, and 5. The shock cord is then run along the inside of the outer support and looped around the corresponding shock cord boss 55. The shock cord is then run back along the inside of the outside support and threaded through the shock cord hole in line with but opposite the initial hole. The shock cord is then threaded through the shock cord hole on the same side of the outer support as the second hole before again being run along the inside of the support and looped around the shock cord boss a second time. The shock cord is then run back along the inside of the outer support, threaded through the last of the shock cord holes, and knotted.

The rear ends of the outside supports are joined by a leg bracket axle 72 which supports a pair of leg bracket bushings 71, which in turn support a leg bracket 70 with leg bracket stops 73, FIGS. 4 and 5. The leg bracket has a rear facing concave surface that cradles the lower leg of the rider's support leg. Furthermore, this concave surface is slightly off center relative to the outer supports and thus the kick scooter.

A heel stop 23 is mounted on the platform 22 of the kick scooter 20, FIG. 2. The heel stop is mounted via threaded fasteners inserted through heel stop slots 24 running longitudinally along either side of the rear of the platform.

As discussed in greater detail below, the performance enhancing device 10 helps support and straighten the support leg 31 of a rider 30 while the rider propels the scooter with their kicking leg 32, as will be appreciated from FIG. 1. More specifically, as the rider 30 flexes their support leg 31, force is applied to the leg bracket 70, moving the outer supports forward in line with the rear slot supports 53 and front slot supports 54, FIGS. 1, 2 and 7-10. Consequently, the strands of shock cord 62 fixed to the outer supports via the shock cord holes 63 and looped around the shock cord bosses 55, which are supported by the inner support rear through rod 51 which in turn is supported by the inner support 50, are elongated, FIG. 5. This stored energy is then returned as the rider straightens their support leg during kicking, FIGS. 11-13.

A second embodiment of a performance enhancement device 10 in accordance with the present invention uses a flexible resilient strip 80, FIGS. 14-17. One end of this strip is attached to a hinged component 84 which in turn is connected to the steering pivot support 21 of a kick scooter 20 via the hinged component axle 88, FIGS. 14 and 17. The other end of the strip supports a leg bracket 70 with a rear facing concave surface that cradles the lower leg of the rider's support leg, FIGS. 14 and 15. Similar to the first embodiment, the concave surface is slightly off center relative to the flexible resilient strip and thus the kick scooter.

The flexible resilient strip 80 has a tapered profile with the thicker end attached to the hinged component 84 and the thinner end attached to the leg bracket, FIGS. 14, 15, and 17. The taper progressively increases the flexibility of the strip from its lowest point at the hinged component to its highest point at the leg bracket. This increasing flexibility compensates for the decreasing leverage moving further away from the hinged component. Consequently, when flexed, rather than most of the curvature being concentrated at the hinged component end as would happen with a strip of uniform thickness, the flexible resilient strip 80 has a roughly uniform curvature along its entire length, FIGS. 14 and 15.

One end of a largely inelastic preload cord 81 is connected to the end of the flexible resilient strip 80 supporting the leg bracket 70, FIGS. 14 and 15. The opposite end of this cord is fixed to a preload cord attachment 85. The hinged component 84 and steering pivot support 21 have respectively a hinged component slot 87 and steering pivot support slot 26 which align when the hinged component is rotated against the steering pivot support, FIG. 16. At the top end of each slot is respectively a hinged component opening 86 and a steering pivot support opening 25 which similarly align when the hinged component is rotated against the steering pivot support. The preload cord attachment mates with these openings and slots, FIGS. 15 and 16.

An elastic take-up cord 82 is knotted at both ends and threaded through holes along the centerline of the flexible resilient strip 80 such that the middle segment of the cord is to the convex side of the strip when the strip is under load, FIGS. 14 and 15. A cord sleeve 83 joins this middle segment of the take-up cord to the preload cord 81. Alternatively, the cord sleeve could be eliminated, and the take-up cord simply looped over the preload cord.

As with the first embodiment a heel stop 23 is mounted on the platform 22 of the kick scooter 20, FIG. 14.

As with the first embodiment of the performance enhancing device 10, this second embodiment also helps support and straighten the support leg 31 of a rider 30 while the rider propels the scooter with their kicking leg 32. More specifically, when the rider flexes their support leg, the leg bracket 70 and supporting flexible resilient strip 80 flex inward storing energy that's returned when the rider straightens their leg, FIGS. 14 and 15. The preload cord 81 maintains a predetermined curvature making it easier to step on and off the kick scooter. As the strip flexes inward during use the take-up cord 82 resiles removing slack, via the cord sleeve 83, in the preload cord.

A third embodiment of a performance enhancement device 10 in accordance with the present invention is shown in FIGS. 18-21. In this embodiment, the device 10 attaches to the platform 22 rather than the steering pivot support of a kick scooter 20. A two-part base 96 is mounted along the rear edges of the platform and has a pair of pivot holes 98 to either side, FIG. 20. These holes roughly align with the ankle joint of the rider and support a pair of pivot bushings 97, FIGS. 18-21. Each bushing connects to one end of a pair of arms 90. The other ends of these arms support either side of a leg bracket 70 with a rear facing concave surface that cradles the lower leg of the rider's support leg. Similar to the first embodiment, the concave surface is slightly off center relative to the arms and thus the kick scooter.

A spring plate 92 is attached to each arm 90 with the free end parallel to the arm and pointing in the general direction of the pivot bushings 97, FIGS. 18-21. Each spring plate has a spring plate catch 93 at its distal end. A secondary arm 91 extends backwards from the pivot bushings with either side having a spring plate catch hole 94. These holes and the corresponding spring plate catches align when the arms and secondary arm are oriented at a right angle.

The secondary arm 91 also has a crosswise section extending laterally across the rear of the platform 22 with two extension spring cord holes 95, FIGS. 18-21. A pair of extension spring cord pulleys 102 are mounted on either end of an extension spring cord pulley axle 103 that is mounted transversely across the rear of the platform. Each of a pair of extension spring cords 101 is threaded through the cord holes and knotted while the other end is led downward, around the corresponding extension spring cord pulley, forward, and tied to one of two extension springs 100, FIG. 20. The pair of extension springs extend forward under the outer edges of the platform where they are hooked through either end of an extension spring anchor rod 104 that runs transversely underneath the platform. Extension spring anchor rod spacers 105 are installed to the inside of each spring. The base 96 also features a pair of secondary arm stops 99, FIGS. 18-21.

As with the first embodiment of the performance enhancing device 10, this third embodiment also helps support and straighten the support leg 31 of a rider 30 while the rider propels the scooter with their kicking leg 32. More specifically, when the rider flexes their support leg the leg bracket 70 and supporting arms 90 rotate forward around the pivot bushings 97 supported by the pivot holes 98 in the base 96, FIGS. 18-20. This also causes the secondary arm 91 to rotate upward via the spring plates 92, spring plate catches 93, and spring plate catch holes 94. This in turn pulls up on the extension spring cords 101 thereby elongating the extension springs 100 fixed to the underside of the platform 22 via the extension spring anchor rod 104. The energy stored in the extension springs is then returned when the rider straightens their leg.

A fourth embodiment of the present invention is identical to the first embodiment except for several modifications, FIGS. 22 and 23. For one, the front end of each outer support 60 supports a pair of shock cord pulleys 110 and a shock cord pulley support 111. In addition, the shock cord holes 63 are at the rear rather than the front end of the outer supports.

Consequently, for each outside support 60 one end of a continuous strand of shock cord 62 is threaded through one of the shock cord holes 63 and knotted. The shock cord is then run along the outside of the outer support and looped around the corresponding shock cord pulley 110. The shock cord is then run along the inside of the outer support and looped around the shock cord boss 55. The shock cord is then run back along the inside of the outer support and looped around the shock cord pulley opposite the first pulley. The shock cord is then run along the outside of the outer support opposite the initial length of shock cord and threaded through the shock cord hole in line with but opposite the initial hole. The shock cord is then threaded through the shock cord hole on the same side of the outer support as the second hole before again being run along the outside of the support and looped again around the second shock cord pulley. The shock cord is then run along the inside of the outer support and looped around the shock cord boss a second time. The shock cord is then run back along the inside of the outer support and again looped around the first shock cord pulley. The shock cord is then run along the outside of the outer support, threaded through the last of the shock cord holes, and knotted.

The fourth embodiment also features front slot support rollers 113 and rear slot support rollers 112, FIGS. 22 and 23. The front slot support rollers are supported by and coaxial with the front slot supports 54. Similarly, the rear slot support rollers are supported by and coaxial with the rear slot supports 53.

As with the first embodiment of the performance enhancing device 10, this third embodiment also helps support and straighten the support leg 31 of a rider 30 while the rider propels the scooter with their kicking leg 32. However, in this embodiment, the addition of shock cord pulleys 110 and shock cord pulley supports 111 at the front ends of the outer supports 60, along with repositioning the shock cord holes 63, extends the path of the shock cord 62. This minimizes the differentiation in tension as the shock cord elongates during kicking thereby leading to smoother operation.

A fifth embodiment of a performance enhancing device 10 in accordance with the present invention, FIGS. 24-28, omits the connector 40 of the first and fourth embodiments. In this embodiment, the inner support 50 is rotatably connected directly to the steering pivot support 21. Specifically, a pair of flanged steering pivot support lateral through hole bushings 29 are inserted in either end of a steering pivot support lateral through hole 28, FIGS. 26 and 27. These bushings in turn support the inner support front through rod 52, FIG. 27.

In addition, rather than front and rear slots and corresponding slot supports, the outer supports 60 have continuous slots 61 and corresponding unified slot supports 130, one on either side of the device, FIG. 27. The supports are flanged, thereby obviating the need for dedicated slot retainers. Slide plates 132 are installed between the slot supports and the inner support 50 allowing the outer supports to slide freely in alignment with the inner support. The sliding of the outer supports is further facilitated by low friction inner 134 and outer slot liners 136.

In addition, the slot supports 130 and slide plates 132 are slightly offset longitudinally, as shown in FIG. 27. Consequently, by flipping the slot supports and slide plates end to end during installation, the device can be assembled with the preloaded position and range of movement of the outer supports 60, leg support 70, and related components slightly shifted front to back. A similar end can be achieved by adjusting the fore/aft position of the heel stop 23, FIGS. 24 and 25.

The angle of the device is maintained by a latch/lateral support 120 made of a flexible yet resilient material, FIGS. 24-26. The latch/lateral support has upper 122 and lower notches 124 either of which can engage the rear edge of an inner support latch/lateral support opening 59 which runs laterally across the inner support 50. The latch/lateral support, particularly the notched portion, has a generally arc-shaped side profile centered around the steering pivot support lateral through hole.

Furthermore, the widths of the latch/lateral support and the inner support latch/lateral support opening closely correspond with one another. Consequently, the outer edges of the latch/lateral support engage with the outer edges of the opening.

In addition, the leg support 70 has been modified to include a leg bracket channel 74 vertically bisecting the concave surface of the leg bracket, FIGS. 24, 25, 27, and 28.

A sixth embodiment of a performance enhancing device 10 in accordance with the present invention is shown in FIGS. 29-32. This embodiment replaces the tapered flexible resilient strip 80 of the second embodiment with a flexible resilient strip of roughly uniform thickness, FIGS. 29, 30, and 32. Furthermore, the hinged component 84 is extended in a rearward direction.

The sixth embodiment also features supplemental flexible resilient strips 89 which overlay the flexible resilient strip 80, FIGS. 29, 30, and 32. These strips have a shape similar to the underlying strip and are similarly uniform in thickness. However, unlike the flexible resilient strip, the supplemental flexible resilient strips are attached at the leg bracket 70 end only.

In addition, the hinged component has, rather than a single central slot, two parallel hinged component slots 87, one on each of the opposing sides, as shown in FIGS. 29-32. When the hinged component is rotated against the steering pivot support 21 these slots align with the outer edges of steering pivot support lateral extensions 27. The preload cord attachment 85 is fashioned to slide simultaneously into the slots and over the extensions.

Furthermore, rather than be threaded through holes along the centerline of the flexible resilient strip 80, the take-up cord 82 is knotted, threaded through a series of holes on one side of the hinged component 84, looped over the preload cord 81, threaded through a similar series of holes on the other side of the hinged component, and knotted again, FIGS. 29, 30, and 32.

As with the fifth embodiment, the leg support 70 has been modified with the addition of a leg bracket channel 74 vertically bisecting the concave surface of the leg bracket, FIGS. 29, 30, and 32.

A seventh embodiment of a performance enhancing device 10 in accordance with the present invention is shown clamped to the steering pivot support 21 of the kick scooter 20, as shown in FIGS. 33-38, rather than being attached directly to the support. The clamp has a clamp lower half 140 and clamp upper half 141 with the upper half having a clamp opening 143 and clamp slot 144, FIGS. 33, 34, and 36, similar to the steering pivot support opening and steering pivot support slot of the second embodiment. The clamp upper half also has a clamp axle hole 142 which, similar to the lateral through hole in the steering pivot support of earlier embodiments, supports the hinged component axle 88 thereby pivotably joining the hinged component indirectly to the steering pivot support.

Furthermore, the leg bracket 70 features a series of leg bracket height adjustment holes 75, FIGS. 33, 34, and 37. In this example, there are three pairs of alternating holes with the bottom and middle holes fixing the leg bracket in the highest position, the second from the bottom and second from the top holes fixing the leg bracket in the middle position, and the middle and top holes fixing the leg bracket in the lowest position. In the drawings the leg bracket is in the middle position. Similar to earlier embodiments, the height adjustment holes 75 are offset, so by laterally flipping the leg bracket it can be installed slightly to the left, or slightly to the right, of the centerline of the scooter.

Along the backside of the leg bracket 70 there are duplicate preload cord end cradles 76 and preload cord openings 77, as best shown in FIG. 37. The bottommost cradle and opening correspond to the bottom and middle leg bracket height adjustment holes 75, the second from the bottom cradle and opening correspond to the second from the bottom and second from the top height adjustment holes, and the third from the bottom cradle and opening correspond to the middle and top height adjustment holes. When the leg bracket is flipped to install it slightly to the left or right of the centerline of the scooter, the fourth and topmost cradle and opening then become the bottommost cradle and opening, as will be appreciated from FIGS. 33, 34, and 37.

Furthermore, the leg bracket 70 is attached to the distal end of the flexible resilient strip 80 via a leg bracket screw plate 78, as shown in FIGS. 34 and 37. This plate incorporates a preload cord end cover 79 that, when the screw plate is fixed in place, seals the back of the corresponding preload cord end cradle 76.

In addition, the flexible resilient strip 80 and supplemental flexible resilient strips 89, while of uniform thickness similar to embodiment six, are wider at their proximal ends and narrower at their distal ends, as shown in FIGS. 33 and 34. Unlike in the sixth embodiment described above, the supplemental strips are attached at the hinged component end rather than the leg bracket end. The strips are attached to the hinged component via the hinged component extension 150 and a flexible resilient strip screw plate 160.

This screw plate also incorporates two parallel sets of take-up cord guide surfaces 161, as shown in FIGS. 33-35. The take-up cord 82 is installed by first looping it over the preload cord 81 and, though not strictly necessary, knotting the free ends together. Each free end of the cord is then threaded through and around the corresponding take-up cord guide surfaces. The ends are then threaded through an opening in the interior of the preload cord attachment 85 and knotted together.

Also, the free end of the preload cord 81 is fixed to the preload cord attachment 85 opposite, relative to the insertion point of the cord, the preload cord attachment channels 170 that engage the hinged component slot 87 and clamp slot 144, as shown in FIGS. 34-36. The cord is fixed in place by tightening the preload cord anchor screw 171 and preload cord anchor nut 172, FIG. 35.

Operation

In use, a kick scooter performance enhancing device 10 in accordance with the present invention is mounted on the steering pivot support 21 of a kick scooter 20 such that the device helps straighten the support leg 31 of a rider 30 while the rider propels the scooter with their kicking leg 32, as shown in FIG. 1.

Specifically, as the rider 30 flexes their support leg 31, force is applied to the leg bracket 70, moving the outer supports forward in line with the rear slot supports 53 and front slot supports 54, FIGS. 1,2 and 7-10. Consequently, the strands of shock cord 62 fixed to the outer supports via the shock cord holes 63 and looped around the shock cord bosses 55, which are supported by the inner support rear through rod 51 which in turn is supported by the inner support 50, are elongated, FIG. 5. This stored energy is then returned as the rider straightens their support leg during kicking, FIGS. 11-13. The tension of the shock cords, to account for a rider's weight for instance, can be adjusted by unknotting either end of both cords, tightening or loosening the cords, and then retying the knots.

The leg bracket 70 and supporting assemblage also laterally stabilize the ankle of the support leg 31 thereby improving handling and stability, FIGS. 1 and 2. The leg bracket bushings 71 and leg bracket axle 72 allow a measure of rotation of the leg bracket, FIGS. 4 and 5. Consequently, as the angle between the support leg and outer supports 60 changes during kicking, the leg bracket rests flush against the support leg. The leg bracket stops 73 confine the bracket to a relatively narrow rotation assuring that the leg bracket is always at a usable angle. The lateral offset of the leg bracket compensates for the slight outward angle of the support leg while riding. Depending on which leg the rider prefers for kicking vs support, by simply flipping the leg bracket, it can be installed with either a right or left offset.

The shock cord bosses 55 also prevent the rear portions of the slots 61 from disengaging from the rear slot supports 53, FIG. 5. Similarly, the front slot retainers 57 prevent the front portions of the slots from disengaging from the front slot supports 54. The shock cord boss caps 56 prevent the shock cord from slipping off the shock cord bosses.

The heel stop 23 prevents the foot of the support leg 31 from sliding backward under the opposing force of the shock cords 62, FIG. 2. Consequently, it assures the maximum amount of energy is both stored in the shock cords and then returned to straighten the support leg. The heel stop slots 24 allow the fore/aft position of the heel stop to be adjusted for maximum comfort.

To prepare for folding of the kick scooter 20 the lock pins 42 are pushed inward thereby compressing the lock pin spring 43, FIGS. 3, 5, and 6. This disengages the lock pins from the initial pair of lock pin holes 44 in the walls of the connector 40. Consequently, the inner support 50, outer supports 60, leg bracket, and related components can be rotated upward around the axis of the inner support front through rod 52. Once a given angle is achieved the lock pins spring outwards engaging a second pair of lock pin holes thereby locking the rotated assemblage in place. The scooter can then be folded without the device getting in the way. The rearward extension of the lateral walls of the connector and, when in use, the pivot plates 58 minimizes lateral wobbling of the device when in use while still allowing for sufficient clearance to easily rotate the device upward.

The second embodiment functions in a manner similar to the first embodiment, FIGS. 14-17. Specifically, when the rider flexes their support leg the leg bracket 70 and supporting flexible resilient strip 80 flex inward storing energy that's returned when the rider straightens their leg, FIGS. 14 and 15. The preload cord 81 maintains a predetermined curvature making it easier to step on and off the kick scooter. As the strip flexes inward during use the take-up cord 82 resiles removing slack, via the cord sleeve 83, in the preload cord. To account for a rider's weight amongst other things, the flexible resilient strip can simply be unscrewed from the hinged component 84 and leg bracket 70 and swapped out with a strip having greater or lesser resilience, FIG. 15.

In addition, the flexible resilient strip 80 is constructed so as to have minimal lateral distortion. Consequently, as with the first embodiment, the leg bracket 70 and supporting assemblage laterally stabilize the ankle of the support leg thereby improving handling and stability.

Furthermore, similar to the first embodiment, the heel stop 23 prevents the foot of the support leg from sliding backward under the opposing force of the flexible resilient strip 80, FIG. 14.

The preload cord attachment 85 is fixed in place by inserting it through the hinged component opening 86 and corresponding steering pivot support opening 25, then sliding it into the hinged component slot 87 and corresponding steering pivot support slot 26, FIGS. 15 and 16. This performs two functions. For one, it anchors the free end of the preload cord 81. In addition, because the preload cord attachment engages both the hinged component 84 and the steering pivot support 21 of the scooter 20, it prevents the device from rotating around the hinged component axle 88 away from the steering pivot support during use. The take-up cord 82, in addition to taking up slack in the preload cord, prevents the preload cord attachment from disengaging from the hinged component and steering pivot support slots.

Conversely, to prepare for folding of the kick scooter 20 the preload cord attachment 85 is disengaged from the hinged component 84 and steering pivot support 21. Consequently, the device is free to rotate around the hinged component axle 88 away from the steering pivot support during folding, FIG. 17.

The third embodiment also functions in a manner similar to the first embodiment, FIGS. 18-21. Specifically, when the rider flexes their support leg the leg bracket 70 and supporting arms 90 rotate forward around the pivot bushings 97 supported by the pivot holes 98 in the base 96, FIGS. 18-20. This also causes the secondary arm 91 to rotate upward via the spring plates 92, spring plate catches 93, and spring plate catch holes 94. This in turn pulls up on the extension spring cords 101 thereby elongating the extension springs 100 fixed to the underside of the platform 22 via the extension spring anchor rod 104. The energy stored in the extension springs is then returned when the rider straightens their leg. The extension spring anchor rod spacers 105 keep the springs clear of the platform and the anchor rod centered. The secondary arm stops 99 incorporated into the base prevent the secondary arm from being pulled downward by any residual force in the extension springs.

As with the first embodiment, the leg bracket 70 and supporting assemblage laterally stabilize the ankle of the support leg thereby improving handling and stability.

Also, similar to the first embodiment, the heel stop 23 prevents the foot of the support leg 31 from sliding backward under the opposing force of the extension springs 100, FIGS. 18 and 19. Though in this case the heel stop cannot be adjusted fore and aft.

To prepare for folding the kick scooter 20 the spring plates 92 are pressed inward disengaging the spring plate catches 93 from the spring plate catch holes 94 in the secondary arm 91, FIGS. 18-20. Consequently, the arms 90 and leg bracket 70 can be freely rotated forward around the pivot bushings 97 allowing the scooter to be folded, FIG. 21.

The fourth embodiment also functions in a manner similar to the first embodiment, FIGS. 22 and 23. However, in this case the addition of shock cord pulleys 110 and shock cord pulley supports 111 at the front ends of the outer supports 60, along with repositioning the shock cord holes 63, extends the path of the shock cord 62. This minimizes the differentiation in tension as the shock cord elongates during kicking thereby leading to smoother operation.

Also, unlike the static slot supports of the first embodiment, the rear slot support rollers 112 and front slot support rollers 113 are free to rotate around the axes of the inner support rear through rod 51 and inner support front through rod 52 respectively. This reduces wear between the slots 61 and supports as well as providing for smoother operation.

The fifth embodiment, shown in FIGS. 24-28, functions in a manner similar to the first and fourth embodiments. However, when the scooter is unfolded, to rotate the device downward, the user presses the latch/lateral support 120 in towards the steering pivot support until the free end of the latch/lateral support clears the rear edge of the inner support latch/lateral support opening 59. The device can then be rotated downward until the rear edge of the opening engages either the upper 122 or lower notch 124 of the latch/lateral support, as shown in FIGS. 24-26. Furthermore, by engaging the outer edges of the inner support latch/lateral support opening 59, the latch/lateral support minimizes lateral wobbling of the device, as will be appreciated from FIGS. 24 and 25.

By flipping the slot supports 130 and slide plates 132 end to end the user can compensate for the slight rearward shift of the leg bracket 70 when the device is rotated downward into the lower position, as will be appreciated from FIGS. 24, 25, and 27. This also has the effect of slightly lengthening the path of the shock cord. Thus, the user would presumably want to lengthen the shock cord as well.

The leg bracket channel 74 relieves pressure on the shin bone making the leg bracket 70 more comfortable, as will be appreciated from FIGS. 24, 25, 27, and 28.

The sixth embodiment, shown in FIGS. 29-32, functions in a manner similar to the first and second embodiments. However, since they are uniform in thickness, the flexible resilient strip 80 and supplemental flexible resilient strips 89, when flexed have a greater curvature towards the hinged component 84 end of the strips, as will be appreciated from FIGS. 29, 30, and 32. The rearward extension of the hinged component maintains the position of the leg bracket 70 despite this change in curvature.

To account for the rider's weight as well as other factors, one or more of the supplemental flexible resilient strips 89, can be added or removed, as will be appreciated from FIGS. 29 and 30. Attaching these strips at one end only prevents them from buckling when flexed.

In a manner similar to that described with respect to the second embodiment, the preload cord attachment 85 anchors the free end of the preload cord 81 by engaging both the hinged component 84 and steering pivot support 21, as shown in FIGS. 29-31. However, in this case, the attachment is slid simultaneously into the hinged component slots 87 on either side of the hinged component and over the steering pivot support lateral extensions 27. Conversely, to prepare for folding of the kick scooter 20, the attachment is disengaged from the slots and extensions, FIG. 32.

The seventh embodiment, shown in FIGS. 33-38, functions in a manner similar to the first, second, and sixth embodiments. However, since the flexible resilient strip 80 and supplemental flexible resilient strips 89 are wider at their proximal ends they tend to flex with a more gradual curvature when under load despite being of uniform thickness, as will be appreciated from FIGS. 33, 34, and 38. This reduces wear and tear on the strips while also making them easy to fabricate.

By allowing the leg bracket 70 to be installed at varying heights, the leg bracket height adjustment holes 75, allow the device 10 to accommodate a range of rider heights, while also allowing the leg bracket to be installed as high as the adjustment holes and the length of the rider's lower leg will allow, as shown in FIGS. 33, 34, and 37. This reduces the force exerted on and by the leg bracket, compensated for by greater fore/aft movement, as the flexible resilient strip 80 and supplemental flexible resilient strips 89, are distorted and resile. Consequently, the height adjustability of the leg bracket improves rider comfort.

The preload cord attachment 85 anchors the free end of the preload cord 81 by engaging both the hinged component slot 87 and the clamp slot 144, as shown in FIGS. 33, 34, and 36, rather than the hinged component slot and steering pivot support slot of the second embodiment. Furthermore, since the preload cord anchor screw 171 and preload cord anchor nut 172 are on the opposite side of the hinged component and clamp slots from the preload cord, pulling the preload cord free would mean pulling the screw and nut through the slots. Consequently, the attachment can be made from a less robust, but more easily fabricated, material.

Similarly, since the preload cord end cradles 76 are along the backside of the leg bracket 70, pulling the leg bracket end of the preload cord 81 free would mean pulling the end past the flexible resilient strip 80, as shown in FIGS. 33, 34, and 37. Thus, the leg bracket end of the preload cord is held in place more securely. In the event the preload cord is made of a stiffer material, the preload cord end cover 79 incorporated into the leg bracket screw plate 78 prevents the end of the preload cord from poking backwards out of the leg bracket when the flexible resilient strip 80, and supplemental flexible resilient strips 89, are flexed.

The take-up cord guide surfaces 161 incorporated into the flexible resilient strip screw plate 160 provide for a longer path of travel in a compact space, as shown in FIGS. 33-35. Consequently, the take-up cord 82 stretches and resiles with a more consistent force. The longer path also helps preserve the elasticity of the take-up cord.

By fixing the free ends of the take-up cord 82 to the preload cord attachment 85, the take-up cord holds the attachment more securely in the hinged component slot 87 and clamp slot 144, as shown in FIGS. 33-36. This is in contrast to the second and sixth embodiments in which the preload cord attachment is secured only by the take-up cord pulling the preload cord inward.

While there have been described herein the principles of the invention, it is to be understood by those skilled in the art that this description is made only by way of example and not as a limitation to the scope of the invention. Accordingly, it is intended by the appended claims, to cover all modifications of the invention which fall within the true spirit and scope of the invention.

What is claimed is:

1. A kick scooter performance enhancing device comprising:
   a clamp configured to be securable to a portion of a kick scooter;
   a leg bracket with a support surface, said surface facing towards the rear of a kick scooter; and
   at least one resilient member having first and second ends, the first end being joined to said clamp, the second end being joined to said leg bracket, said at least one resilient member resisting forward movement of said leg bracket;
   wherein said at least one resilient member is shaped to permit resilient deflection in a longitudinal direction aligned with said clamp, and to be laterally rigid to resist resilient deflection in a lateral direction transverse to said longitudinal direction, to provide a laterally rigid resilient mechanism such that resilient force exerted by the resilient member is longitudinally aligned with the kick scooter when mounted thereto; and
   whereby forward movement of said leg bracket relative to said clamp distorts said at least one resilient member to store energy in said at least one resilient member, and wherein subsequent resiling of said at least one resilient member returns stored energy to reduce energy expended by the kick scooter rider by providing a restorative force in a rearward direction that is operable to straighten a leg of the kick scooter rider when said clamp is secured to the kick scooter and said at least one resilient member has been distorted by flexing of said leg against said leg bracket.

2. The performance enhancing device of claim 1, wherein said at least one resilient member comprises at least one flexible resilient strip.

3. The performance enhancing device of claim 2, wherein said at least one of said flexible resilient strip tapers from said first end toward said second end.

4. A kick scooter performance enhancing device comprising:
   a clamp configured to be securable to a portion of a kick scooter;
   a leg bracket with a support surface, said surface facing towards the rear of a kick scooter; and
   at least one resilient member having first and second ends, the first end being joined to said clamp, the second end being joined to said leg bracket, said at least one resilient member resisting forward movement of said leg bracket; and
   an inelastic preload cord having first and second ends, said first end of said inelastic preload cord being joined to said second end of said at least one flexible resilient strip;
   whereby forward movement of said leg bracket distorts said at least one resilient member, and said at least one resilient member consequently resiles to provide a restorative force in a rearward direction.

5. The performance enhancing device of claim 4, further comprising a hinged component joined to said clamp, wherein said first end of said at least one flexible resilient strip is joined to said hinged component for pivotable motion relative to said clamp, and said second end of said inelastic preload cord is connected to a preload cord attachment engaging both said hinged component and said clamp, said inelastic preload cord and said preload cord attachment being constrained by an elastic take-up cord.

6. The performance enhancing device of claim 4, wherein said second end of said inelastic preload cord is attached to said clamp, said inelastic preload cord being constrained by an elastic take-up cord joined to said at least one flexible resilient strip.

7. The performance enhancing device of claim 5, further comprising a hinged component extension joined to said hinged component, wherein said first end of said at least one flexible resilient strip is joined to said hinged component extension by a flexible resilient strip screw plate having take-up cord guide surfaces, said take-up cord being guided by said take-up cord guide surfaces.

8. The performance enhancing device of claim 5, wherein said hinged component further defines a hinged component slot, said clamp defines a clamp slot, and wherein said preload cord attachment further comprises preload cord attachment channels, wherein said preload cord attachment channels engage said hinged component slot and said clamp slot, said second end of said preload cord being fixed in place.

9. The performance enhancing device of claim 1, wherein said leg bracket is laterally off-center relative to a centerline of the kick scooter.

10. The performance enhancing device of claim 1, wherein said leg bracket defines a plurality of spaced openings providing leg bracket height adjustment.

11. The performance enhancing device of claim 4, wherein said leg bracket defines at least one preload cord end cradle, said at least one preload cord end cradle being disposed opposite said second end of said at least one flexible resilient strip from said second end of said inelastic preload cord.

12. The performance enhancing device of claim 11, further comprising a leg bracket screw plate, wherein said leg bracket is joined to said second end of said at least one flexible resilient strip by said leg bracket screw plate, said leg bracket screw plate further comprising a preload cord end cover, said preload cord end cover sealing the back of said preload cord end cradle.

13. A kick scooter with a performance enhancing device comprising:
- a platform having first and second ends, said first end supporting a steering pivot support, said steering pivot support supporting a steering column, said steering column being supported by a fork, said fork being supported by a front wheel, said second end of said platform supported by a rear wheel;
- a clamp joined to said steering pivot support;
- a leg bracket having a support surface, said support surface facing towards said second end of said platform; and
- at least one resilient member having first and second ends, said first end being joined to said clamp, said second end being joined to said leg bracket, said at least one resilient member comprising a plurality of discrete flexible resilient strips;
- whereby forward movement of said leg bracket distorts said at least one resilient member, urging said at least one resilient member to consequently resile to provide a restorative force in a rearward direction.

14. The performance enhancing device of claim 13, wherein at least one of said plurality of flexible resilient strips is tapered from said first end toward said second end.

15. The performance enhancing device of claim 13, wherein said first end of said at least one resilient member is pivotably joined to said clamp for pivotable motion relative to said clamp.

16. The performance enhancing device of claim 13, wherein said leg bracket defines a plurality of spaced openings providing leg bracket height adjustment.

17. The performance enhancing device of claim 13, further comprising an inelastic preload cord having first and second ends, said first end of said inelastic preload cord being joined to at least one of said plurality of flexible resilient strips, said second end of said inelastic preload cord being attached to said clamp, said inelastic preload cord being constrained by an elastic take-up cord joined to said at least one of said plurality of flexible resilient strips.

18. A kick scooter performance enhancing device comprising:
- a clamp configured for attachment to a kick scooter;
- a leg bracket having a support surface, said support surface facing towards a rear of said kick scooter; and
- at least one resilient member having first and second ends, said first end being joined to said clamp, said second end being joined to said leg bracket, said at least one resilient member being shaped to permit resilient deflection in a longitudinal direction aligned with said clamp, and to be laterally rigid to resist resilient deflection in a lateral direction transverse to said longitudinal direction, to provide a laterally rigid resilient mechanism such that resilient force exerted by the resilient member is longitudinally aligned with the kick scooter when mounted thereto;
- whereby forward movement of said leg bracket distorts said at least one resilient member, urging said at least one resilient member to consequently resile to provide a restorative force in a rearward direction.

19. The performance enhancing device of claim 18, wherein said at least one resilient member comprises a plurality of flexible resilient strips, at least one of said plurality of flexible resilient strips being tapered from said first end toward said second end.

20. The performance enhancing device of claim 19, wherein said first end of said at least one resilient member is pivotably joined to said clamp for pivotable motion relative to said clamp.

21. The performance enhancing device of claim 20, wherein said leg bracket defines a plurality of spaced openings providing leg bracket height adjustment.

22. The performance enhancing device of claim 21, further comprising an inelastic preload cord having first and second ends, said first end of said inelastic preload cord being joined to at least one of said plurality of flexible resilient strips, said second end of said inelastic preload cord being attached to said clamp, said inelastic preload cord being constrained by an elastic take-up cord joined to said at least one of said plurality of flexible resilient strips.

* * * * *